United States Patent
Beale et al.

(10) Patent No.: US 12,425,967 B2
(45) Date of Patent: Sep. 23, 2025

(54) COMMUNICATIONS DEVICES AND METHODS

(71) Applicant: Sony Group Corporation, Tokyo (JP)

(72) Inventors: Martin Warwick Beale, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 324 days.

(21) Appl. No.: 17/795,549

(22) PCT Filed: Feb. 11, 2021

(86) PCT No.: PCT/EP2021/053291
§ 371 (c)(1),
(2) Date: Jul. 27, 2022

(87) PCT Pub. No.: WO2021/165128
PCT Pub. Date: Aug. 26, 2021

(65) Prior Publication Data
US 2023/0046262 A1     Feb. 16, 2023

(30) Foreign Application Priority Data
Feb. 17, 2020 (EP) .................................... 20157800

(51) Int. Cl.
*H04W 52/02* (2009.01)
*H04L 5/00* (2006.01)
(Continued)

(52) U.S. Cl.
CPC ....... *H04W 52/0229* (2013.01); *H04L 5/0007* (2013.01); *H04W 72/20* (2023.01); *H04W 76/28* (2018.02)

(58) Field of Classification Search
None
See application file for complete search history.

(56) References Cited

U.S. PATENT DOCUMENTS

| | | | |
|---|---|---|---|
| 11,659,551 B2 * | 5/2023 | Cao | H04W 72/02 370/330 |
| 12,069,618 B2 * | 8/2024 | Yeo | H04W 72/044 |

(Continued)

FOREIGN PATENT DOCUMENTS

| | | |
|---|---|---|
| CN | 110679190 A | 1/2020 |
| EP | 3500028 A1 | 6/2019 |

(Continued)

OTHER PUBLICATIONS

International Search Report and Written Opinion mailed on May 3, 2021, received for PCT Application PCT/EP2021/053291, filed on Feb. 11, 2021, 12 pages.

(Continued)

*Primary Examiner* — Mariela Vidal Carpio
(74) *Attorney, Agent, or Firm* — XSENSUS, LLP

(57) ABSTRACT

A communications device is provided. The communications device (which is a receiving communications device) comprises a transceiver configured to receive signals from and/or to transmit signals to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions, and a controller. The controller is configured in combination with the transceiver to exchange control signaling with a first transmitting communications device of the plurality of other communications devices. Here, the control signaling comprises an indication of a current power saving status of the receiving communications device.

17 Claims, 17 Drawing Sheets

(51) Int. Cl.
*H04W 72/20* (2023.01)
*H04W 76/28* (2018.01)

(56) References Cited

U.S. PATENT DOCUMENTS

| | | | | |
|---|---|---|---|---|
| 2018/0206176 | A1* | 7/2018 | Panteleev | H04W 72/20 |
| 2019/0174411 | A1* | 6/2019 | Xu | H04W 52/0216 |
| 2019/0373647 | A1* | 12/2019 | Rugeland | H04W 72/0446 |
| 2019/0386718 | A1* | 12/2019 | Sengupta | H04L 1/0038 |
| 2020/0163155 | A1* | 5/2020 | Lee | H04W 72/23 |
| 2020/0344722 | A1* | 10/2020 | He | H04W 72/02 |
| 2021/0022127 | A1* | 1/2021 | Xu | H04W 72/20 |
| 2021/0144750 | A1* | 5/2021 | Cao | H04W 72/0453 |
| 2021/0298114 | A1* | 9/2021 | Nam | H04W 76/28 |
| 2021/0351877 | A1* | 11/2021 | Xu | H04L 5/0055 |
| 2022/0167374 | A1* | 5/2022 | Li | H04L 1/0068 |
| 2022/0174774 | A1* | 6/2022 | Tseng | H04W 76/34 |
| 2022/0200738 | A1* | 6/2022 | Hosseini | H04W 72/02 |
| 2022/0225290 | A1* | 7/2022 | Ganesan | H04W 24/10 |
| 2022/0264531 | A1* | 8/2022 | Xing | H04W 72/02 |
| 2022/0369417 | A1* | 11/2022 | Park | H04W 52/0216 |
| 2023/0055108 | A1* | 2/2023 | Beale | H04W 76/28 |
| 2023/0063472 | A1* | 3/2023 | Freda | H04W 76/28 |
| 2023/0100797 | A1* | 3/2023 | Beale | H04L 5/0005 |
| | | | | 370/330 |
| 2023/0171036 | A1* | 6/2023 | Selvanesan | H04L 1/1635 |
| | | | | 370/315 |
| 2023/0180179 | A1* | 6/2023 | Hahn | H04W 4/70 |
| | | | | 455/458 |
| 2023/0209476 | A1* | 6/2023 | Kim | H04W 52/36 |
| | | | | 370/311 |
| 2024/0015830 | A1* | 1/2024 | Hong | H04W 74/0808 |
| 2024/0080864 | A1* | 3/2024 | Ye | H04W 76/14 |
| 2024/0214940 | A1* | 6/2024 | Zhang | H04W 52/0229 |

FOREIGN PATENT DOCUMENTS

| | | | | |
|---|---|---|---|---|
| WO | WO-2016166182 | A1 | 10/2016 | |
| WO | WO-2018028416 | A1 * | 2/2018 | H04W 52/02 |
| WO | WO-2018064477 | A1 * | 4/2018 | H04W 76/02 |

OTHER PUBLICATIONS

Intel Corporation et al., "Discontinuous reception over SL", 3GPP TSG RAN WG2#97 bis, R2-1703502, Apr. 3-7, 2017, 2 pages.

Holma et al., "LTE for UMTS OFDMA and SC-FDMA Based Radio Access", John Wiley & Sons, 2009, 232 pages.

NTT Docomo Inc., "Revised WID on New Radio Access Technology", 3GPP TSG RAN Meeting #78, RP-172834, Dec. 18-21, 2017, 11 pages.

3GPP, "NR; Study on UE Power Saving (Release 16)", 3GPP TR 38.840 V0.1.0, Nov. 2018, pp. 1-24.

3GPP, "Evolved Universal Terrestrial Radio Access (E-UTRA) and Evolved Universal Terrestrial Radio Access Network (E-UTRAN); Overall description; Stage 2 (Release 16)", 3GPP TS 36.300 V16.0.0, Dec. 2019, pp. 1-366.

3GPP, "NR; Medium Access Control (MAC) protocol specification (Release 15)", 3GPP TS 38.321 V15.4.0, Dec. 2018, pp. 1-77.

* cited by examiner

COMMUNICATIONS DEVICES AND METHODS

CROSS-REFERENCE TO RELATED APPLICATIONS

The present application is based on PCT filing PCT/EP2021/053291, filed Feb. 11, 2021, which claims priority to EP 20157800.2, filed Feb. 17, 2020, the entire contents of each are incorporated herein by reference.

BACKGROUND

Field of Disclosure

The present disclosure relates generally to communications devices and methods of operating communications devices and specifically to communications devices configured to communicate with other communications device via device-to-device (D2D) communications via a sidelink interface.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One aspect of both LTE and NR is direct device-to-device (D2D) communications between two communications devices, wherein some of the signals are not transmitted to or from a base station. Such D2D communications are also referred to as sidelink communications, and signals are transmitted directly between communications devices over a sidelink interface.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a communications device. The communications device (which is a receiving communications device) comprises a transceiver configured to receive signals from and/or to transmit signals to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions, and a controller. The controller is configured in combination with the transceiver to exchange control signaling with a first transmitting communications device of the plurality of other communications devices. Here, the control signaling comprises an indication of a current power saving status of the receiving communications device.

Embodiments of the present technique, which further relate to transmitting communications devices, methods of operating receiving and transmitting communications devices and circuitry for receiving and transmitting communications devices, allow for the reduction of battery power consumption for sidelink/D2D communications.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
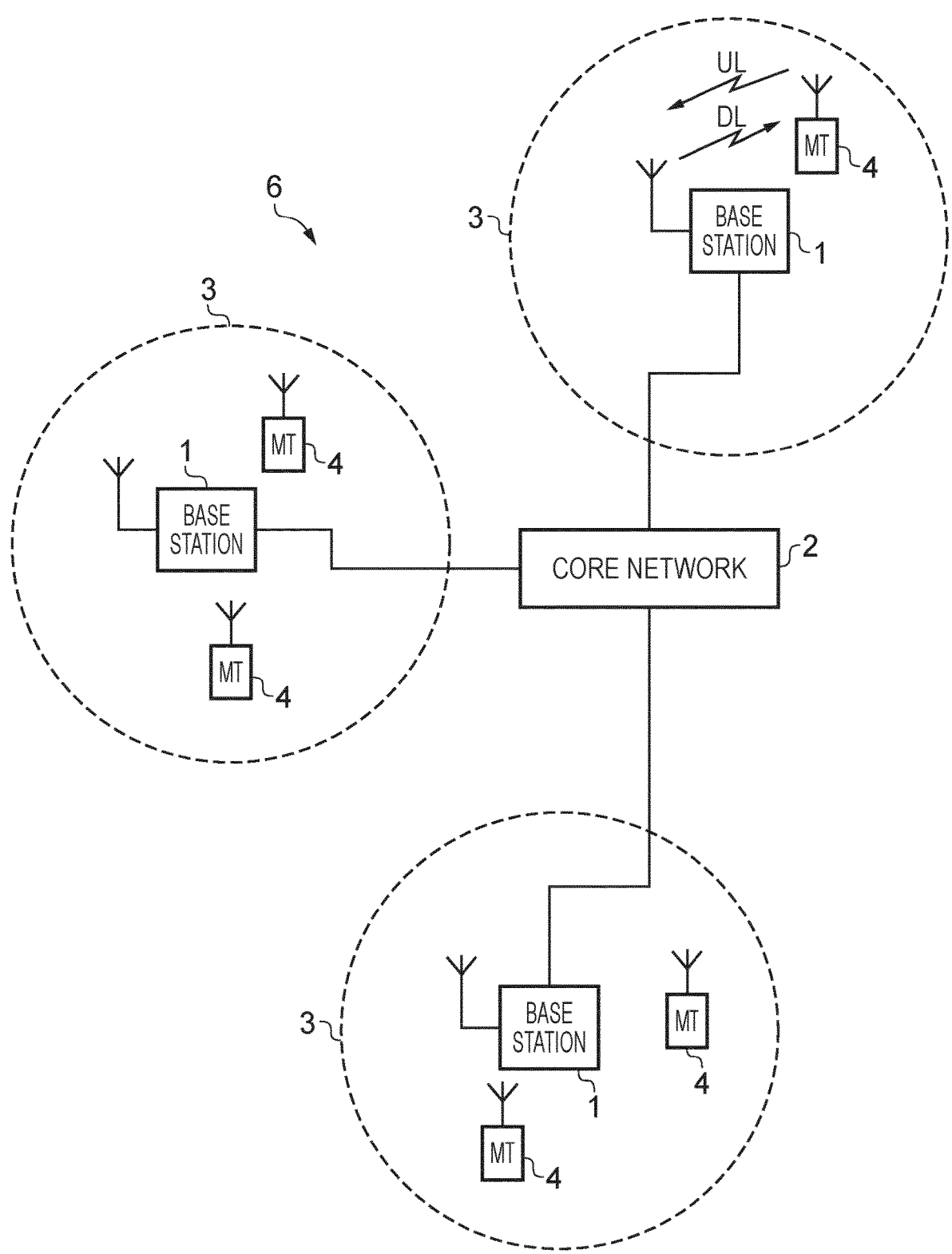
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from terminal devices 4. Data is transmitted from base stations 1 to terminal devices 4 within their respective coverage areas 3 via a radio downlink (DL). Data is transmitted from terminal devices 4 to the base stations 1 via a radio uplink (UL). The core network 2 routes data to and from the terminal devices 4 via the respective base stations 1 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)

Massive Machine Type Communications (mMTC)

Ultra Reliable & Low Latency Communications (URLLC) [2]

eMBB services are characterised by high capacity with a requirement to support up to 20 Gbs. The requirement for URLLC is a reliability of $1$-$10^{-5}$ (99.999%) for one transmission of a relatively short packet such as 32 bytes with a user plane latency of 1 ms.

The elements of the wireless access network shown in FIG. 1 may be equally applied to a 5G new RAT configuration, except that a change in terminology may be applied as mentioned above.

Figure 2:
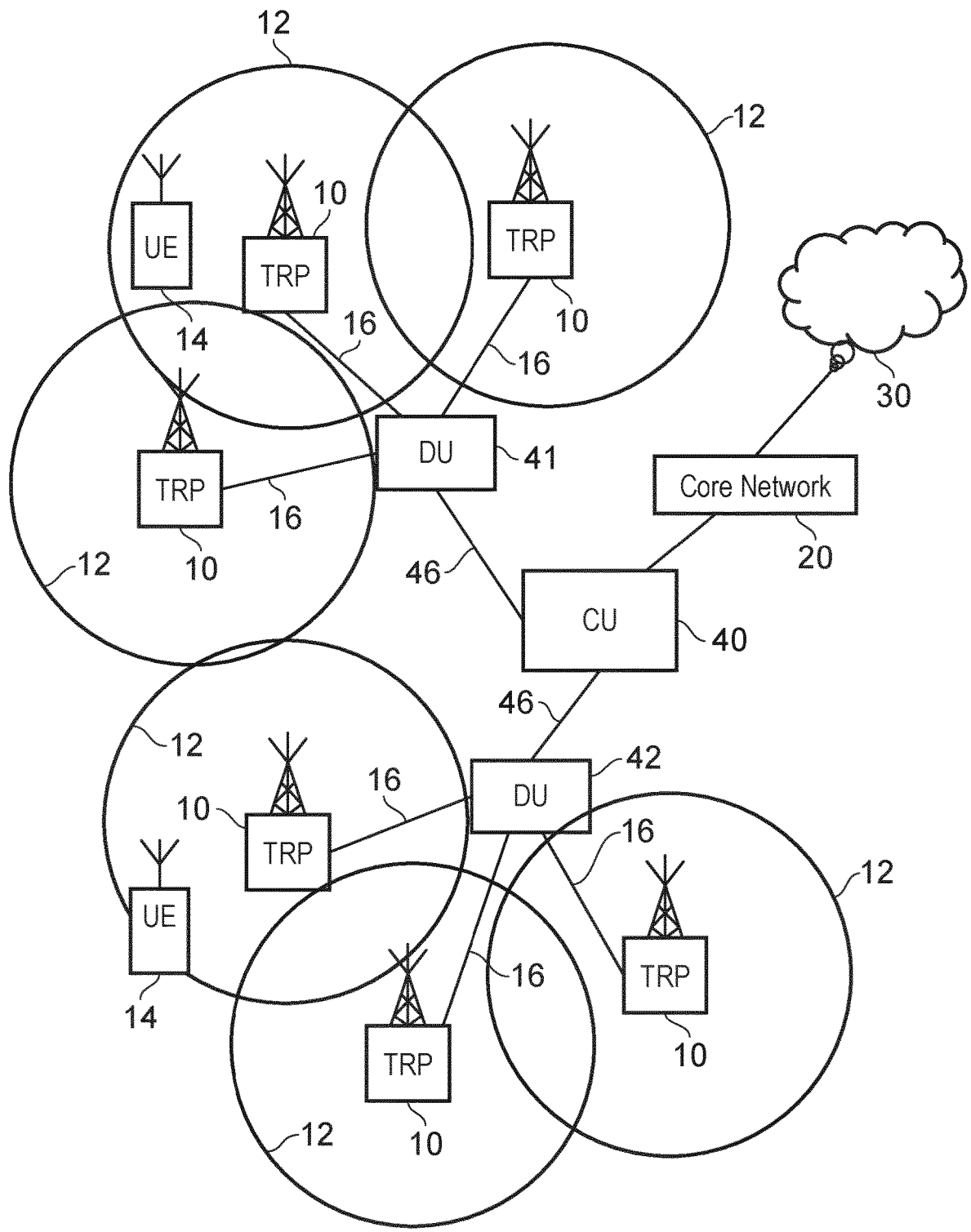
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signaling with the first central unit 40 in the first communication cell 12 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or distributed control unit 41 and/or a TRP 10 of the kind shown in FIG. 2 which is adapted to provide functionality in accordance with the principles described herein.

Figure 3:
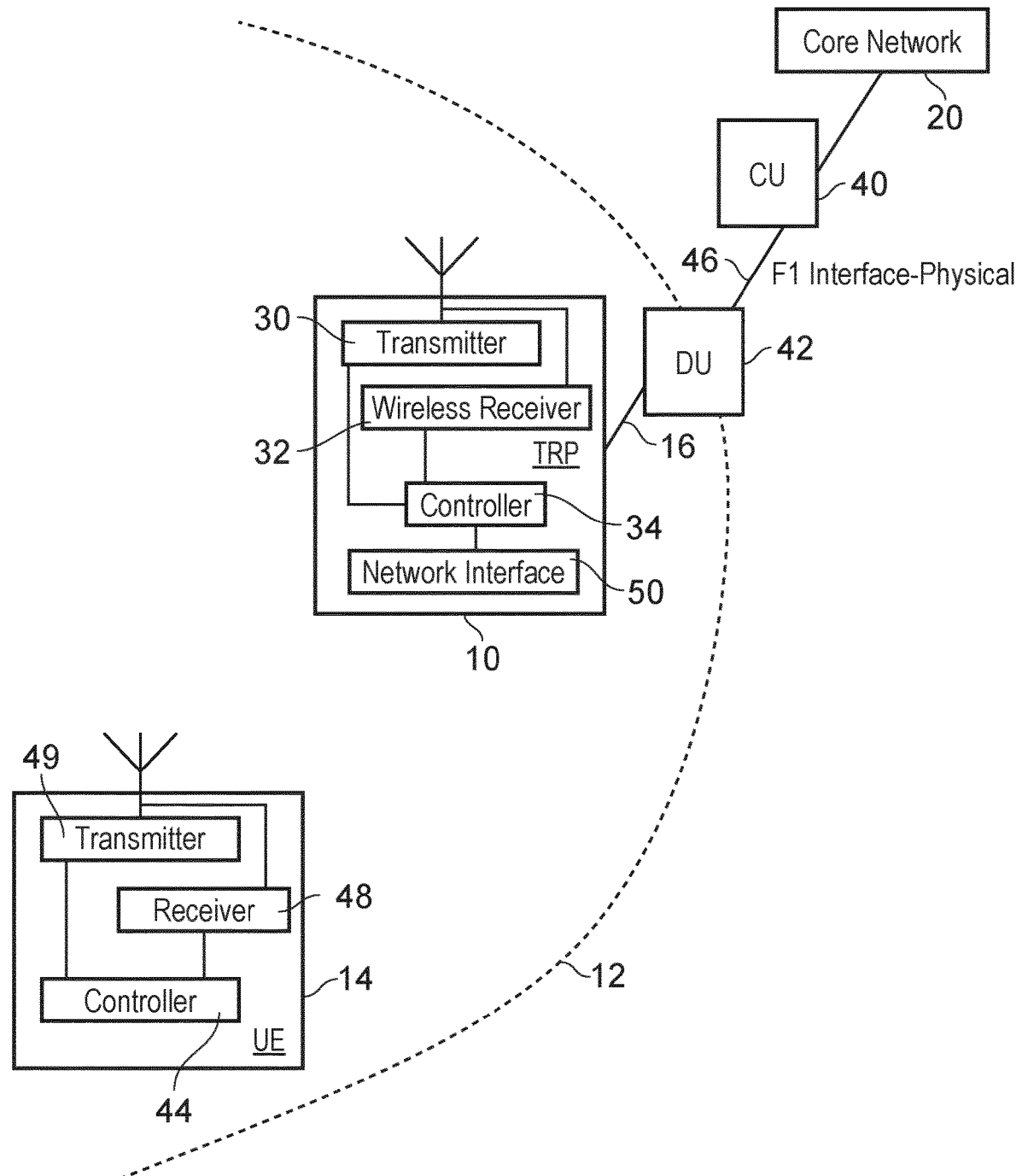
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signaling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

Power Saving and Discontinuous Reception (DRX) in NR

In a typical currently deployed network, idle mode terminal devices are configured to monitor for paging messages periodically. For terminal devices (in connected and idle mode) operating in a discontinuous reception (DRX) mode this occurs when they wake up for their DRX wake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network. In connected mode, the terminal device is configured to periodically monitor PDCCH in groups of slots or subframes. If a PDCCH is not detected during the group of slots or subframes, the terminal device may sleep for the next cycle of the periodicity. Power saving is an important aspect of a user's experience of NR, which will influence the adoption of 5G handsets and/or services. DRX is one method of power saving for NR terminal devices.

Figure 4:
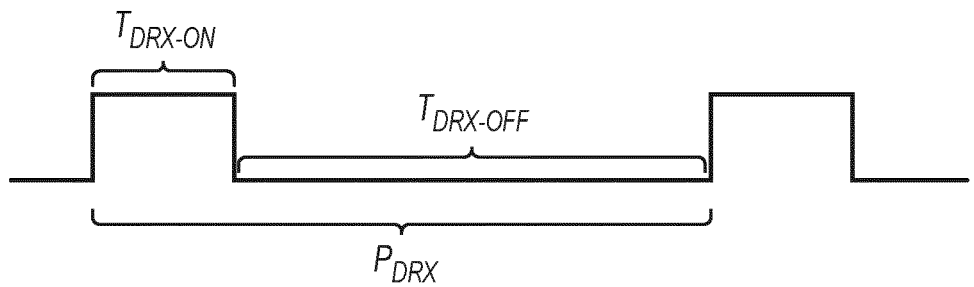
FIG. 4 shows an example of a discontinuous reception (DRX) cycle.

The basic DRX cycle is shown in FIG. 4, which consists of a DRX ON period of duration $T_{DRX-ON}$ and a period of inactivity, i.e. a DRX OFF period of duration $T_{DRX-OFF}$ where the DRX ON period occurs periodically at a DRX period, $P_{DRX}$. During the DRX ON period, the UE switches on its receiver to monitor for downlink traffic and switches off its receiver during the DRX OFF period to save power consumption. The DRX parameters $T_{DRX-ON}$ & $P_{DRX}$ are configured by the network. It should be appreciated by those skilled in the art that such a basic operation may not always be efficient, particularly if a UE frequently does not receive any signals during the ON period (or active operating mode) of the DRX operation.

Figure 5:
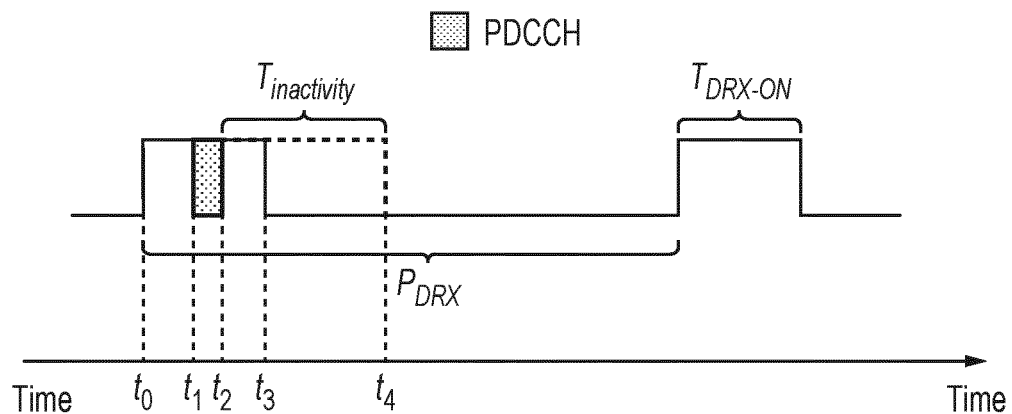
FIG. 5 shows an example of how an inactivity timer may be used during DRX.

If a PDCCH is detected for the UE during the DRX ON period, the UE starts an inactivity timer $T_{Inactivity}$ specifying a period in which the UE will remain awake (i.e. receiver is active) and continues to monitor for further downlink and/or uplink traffic, notably PDCCH. When the inactivity timer expires, the UE moves to the DRX OFF state. An example is shown in FIG. 5, where a PDCCH is detected at time $t_1$ of a DRX ON period, which triggers the inactivity timer which starts at time $t_2$ for a duration of $T_{Inactivity}$. When the timer expires at time $t_4$, the UE switches off its receiver. The inactivity period can extend beyond the DRX ON period; that is, the UE continues to stay awake after the DRX ON period as shown in FIG. 5 where the DRX ON ends at time $t_3$ and the inactivity period continues until time $t_4$. The rationale here is that if the UE receives a data packet, then it is likely it may receive another data packet in the near future and so if the UE receives a data packet towards the end of its DRX ON period, the inactivity timer will keep the UE awake to receive potential further data packets. If the UE receives a packet during the inactivity period, the inactivity timer will reset, i.e. the UE would extend its wake up duration due to the possibility of receiving yet further data packets.

Figure 6:
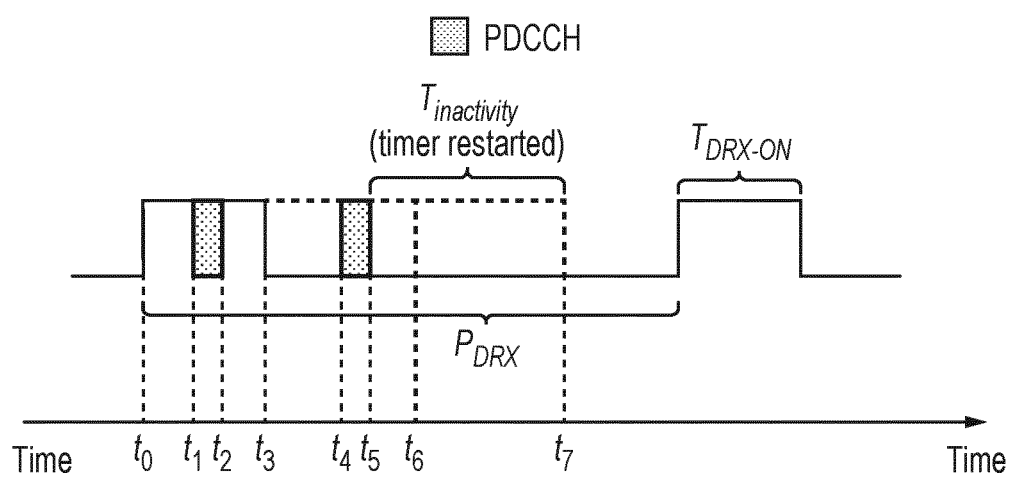
FIG. 6 shows an example of how an inactivity timer may be restarted when a further physical downlink control channel (PDCCH) is detected before the previous inactivity timer expires.

If during the inactivity period, the UE receives a further PDCCH, the inactivity timer is reset, i.e. restarted. It should be noted that the inactivity timer is only restarted here following a single successful decoding of the further PDCCH for a first transmission only; i.e. not when that further PDCCH is a retransmission. An example is shown in FIG. 6, where during a DRX ON period (between time $t_0$ and $t_3$), a PDCCH is detected by the UE at time $t_1$ and so the inactivity timer starts after the PDCCH at time $t_2$ which expires at time $t_6$. During this first inactivity period, another PDCCH is detected at time $t_4$ which then resets the inactivity timer, i.e. the inactivity timer restarts after this PDCCH at time $t_5$ with a duration of $T_{inactivity}$. This follows the same rationale above; that if a data packet is transmitted for a UE then it is likely that another data packet would be transmitted for the same UE in the near future.

The inactivity timer is configured via RRC signaling by the network and can range from 0 ms to 2560 ms. In [3], some DRX parameters and $T_{inactivity}$ values are proposed for evaluation, which represent likely network configurations. Example values in [3] include 10 ms $T_{DRX-ON}$ with 200 ms $T_{activity}$, 8 ms $T_{DRX-ON}$ with 100 ms $T_{inactivity}$. It is observed that the inactivity period is typically significantly longer than the DRX ON duration, which would also consume significant battery power.

DRX may be further characterised (as is described in [4]) by an active time, which defines the total duration during which the UE monitors PDCCH, including the on duration DRX ON of the DRX cycle, the time during which the UE is performing continuous reception while the inactivity timer has not expired, and the time during which the UE is performing continuous reception while waiting for a retransmission opportunity. DRX may also be characterised by a retransmission timer, which signifies a duration until a retransmission can be expected. It would be appreciated by those skilled in the art that inactivity timers, on-duration timers, retransmission timers and the link are enumerated in units of subframes in LTE and in units of 1 ms, or sub-millisecond (i.e. $\frac{1}{32}$ ms) in NR.

Short DRX Operation

Both NR and LTE support a short DRX mode of operation. The short DRX cycle may be optionally implemented within a long DRX (i.e. standard) cycle and follows the period where the inactivity timer is running It is controlled by the following parameters:

drx-ShortCycle (optional): the Short DRX cycle; and
drx-ShortCycleTimer (optional): the duration the UE shall follow the Short DRX cycle.

Figure 7:
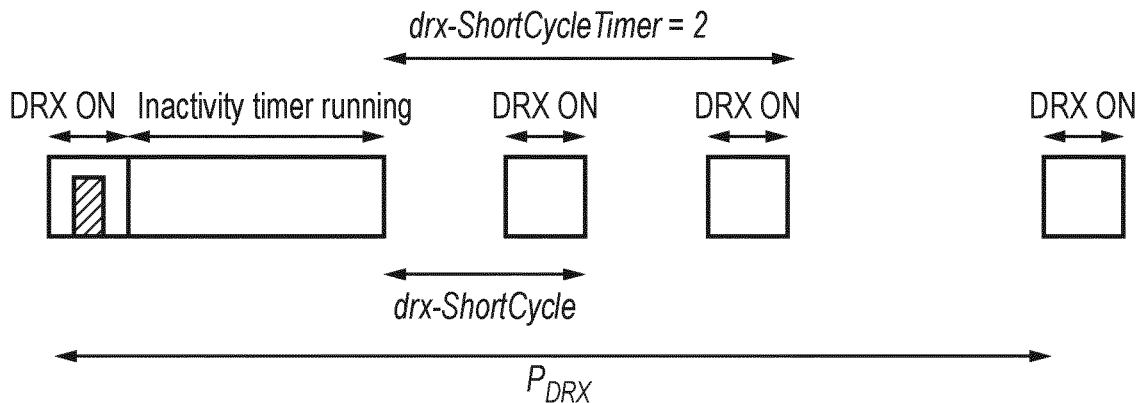
FIG. 7 shows a first example of a short DRX operation.

Operation of short DRX is described in the 3GPP Technical Specification 38.321 [5], in section 5.7. Some of the text herein describing the short DRX operation is reproduced and adapted from [5]. The principle of operation of "short DRX" is that PDCCH is monitored according to a DRX cycle once the inactivity period has expired. This is illustrated in FIG. 7 which shows the following aspects of short DRX operation:

If there has been activity in the initial DRX_ON period (as shown with the hashed box), the inactivity timer is started;
If there is no activity (no PDCCH received) during the running of the inactivity timer, the system enters into short DRX operation;
Short DRX has periods where the UE monitors PDCCH and periods where it doesn't. As can be seen, in the example of FIG. 7, the UE starts short DRX by not monitoring PDCCH;
Every drx-ShortCycle number of subframes, the UE monitors PDCCH for DRX_ON number of subframes. For example, if drx-ShortCycle=16 and DRX_ON=4, the UE monitors PDCCH for 4 subframes out of every 16. The subframes that the UE monitors for PDCCH are known to both the UE and the network;
The UE performs drx-ShortCycleTimer number of short DRX cycles. As can be seen, in the example of FIG. 7, drx-ShortCycleTimer=2;
If there is no activity during the short DRX operation, the UE goes to sleep and wakes up to monitor PDCCH after the end of the long DRX cycle (i.e. after $P_{DRX}$ subframes).

Figure 8:
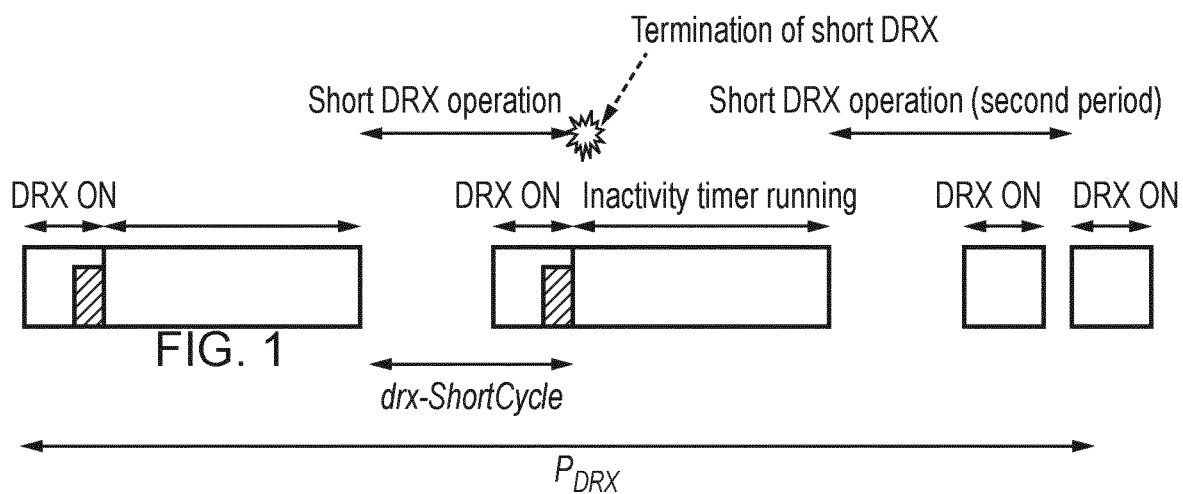
FIG. 8 shows a second example of a short DRX operation where an inactivity timer may be restarted during the initial short DRX operation.

If the UE decodes a PDCCH during one of the DRX_ON durations of the short DRX phase, the UE restarts its inactivity timer (and can then enter a second period of short DRX if there was no PDCCH activity during this second running of the inactivity timer). This operation is shown in FIG. 8. The duration of the inactivity timer and the parameters controlling short-DRX operation are configurable. At the extremes, the network can configure:

Inactivity timer=0: in this case, the UE transitions directly from DRX_ON to short-DRX;
Short-DRX not configured (as described above, short DRX is an optional feature): in this case, following expiry of the inactivity timer, the UE goes into sleep mode until the end of the period $P_{DRX}$ (i.e. until the end of the long DRX cycle).

Device-to-Device (D2D) and Sidelink Communications

Device-to-Device (D2D) communications is an aspect of mobile communications which has been established for devices to communicate directly with each other rather than via a wireless communications network. That is to say that radio signals representing data are transmitted via a wireless interface by one device and received by another to communicate that data, rather than the signals being transmitted to radio infrastructure equipment of a wireless communication network, which are then detected and decoded by the infrastructure equipment to recover that data and communicated on to a destination device.

Figure 9:
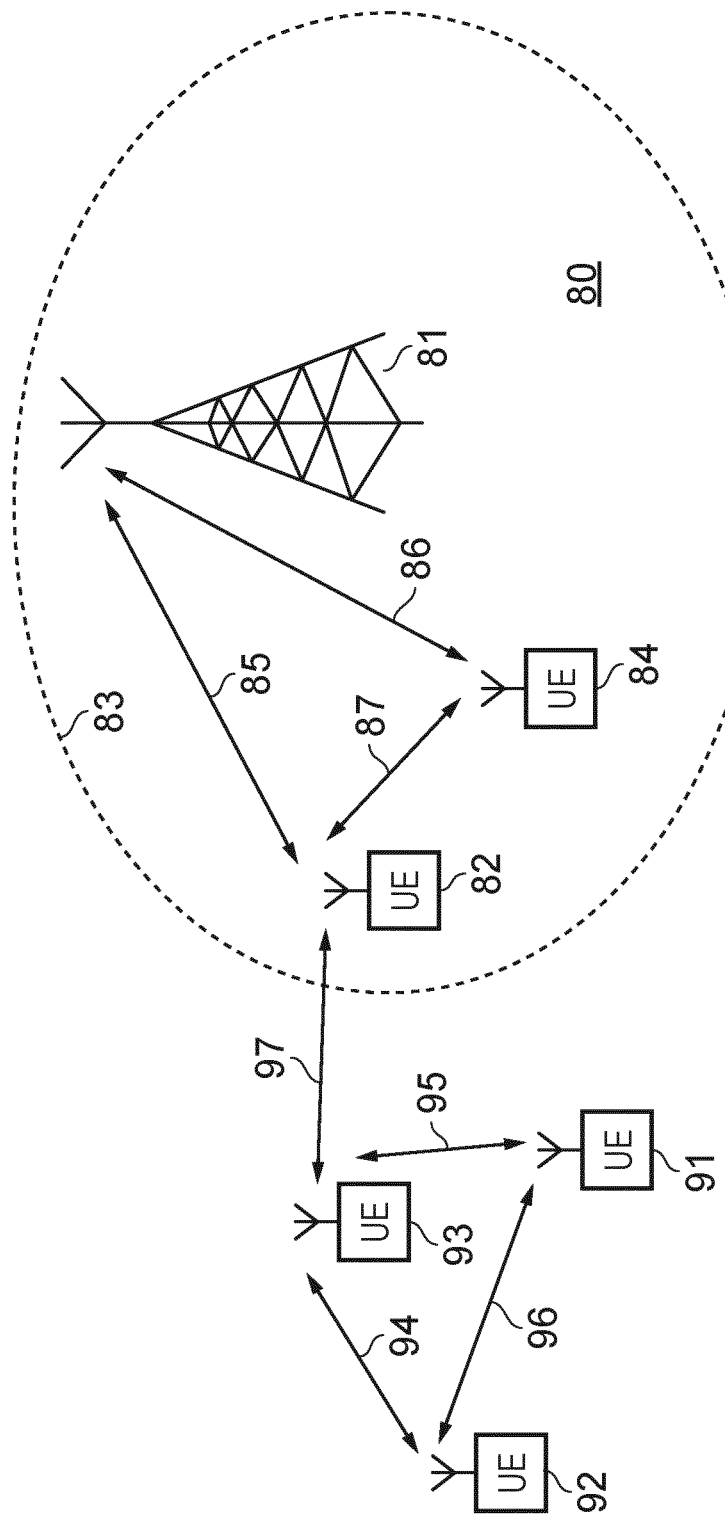
FIG. 9 schematically represents examples of communications devices communicating with each other in accordance with different examples of device-to-device (D2D) communications.

D2D communications can take different forms, which are illustrated in FIG. 9. As shown in FIG. 9, in one example two communications devices (UEs) 82, 84 are operating within a coverage area of a cell 80 provided by radio infrastructure equipment 81, which has a cell boundary 83 represented by a dashed line. The radio infrastructure equipment 81 may for example be a TRP 10 such as that shown in FIG. 2. As represented by dashed lines 85, 86, the UEs 82, 84, may transmit and receive signals to the infrastructure equipment 81 to transmit or to receive data on an uplink or a downlink respectively of a wireless access interface formed by a wireless communications network of which the infrastructure equipment 81 forms part. However within the radio coverage area of the cell 80 the UEs 82, 84 may communicate directly between one another via a D2D wireless access interface as represented by a dashed line 87. The UEs 82, 84 can be configured to transmit and to receive signals via a D2D wireless access interface which may be separate and not shared or overlap a frequency band of the wireless access interface provided by the infrastructure equipment 81. Alternatively the UEs 82, 84 may transmit and receive signals via a part of the wireless access interface provided by the infrastructure equipment 81. A D2D wireless access interface formed for one UE to transmit radio signals to another UE is referred to as a sidelink or PC5.

Another example of D2D communications is also shown in FIG. 9 where UEs fall outside a coverage area of a wireless communication network and so communicate directly with one another. As represented by dashed lines 94, 95, 96, three UEs 91, 92, 93 are operable to transmit and receive signals representing data via sidelinks These sidelinks 94, 95, 96 may be formed by a D2D wireless access interface which falls within a frequency band of the infrastructure equipment 81 or may be outside this frequency band. However the UEs 91, 92, 93 organise access to a D2D wireless access interface autonomously without reference to a wireless access interface. In some cases, the UEs 91, 92, 93 may be pre-configured with some parameters for a D2D wireless access interface. As another example, one of the UEs 82 within the coverage area of the cell 80 acts as a relay node for one or more of the UEs 91, 92, 93 which are outside the coverage area as represented by a sidelink 97.

Here D2D communications of the form of sidelink 87 are referred to as in-coverage communications, D2D communications of the form of sidelink 97 are referred to as partial coverage communications, and D2D communications of the form of sidelinks 94, 95, 96 are referred to as out-of-coverage communications.

According to 3GPP standards such as LTE, whilst downlink and uplink communications are specified for transmissions from an infrastructure equipment such as a gNB to a UE and from a UE to a gNB respectively, sidelink communications are specified to realise UE-to-UE (device-to-device (D2D)) communication, especially for sidelink discovery, sidelink communication and vehicle to everything (V2X) sidelink communication between UEs. The LTE sidelink has the following characteristics as described below, which are reproduced from [4]:

Sidelink comprises sidelink discovery, sidelink communication, and V2X sidelink communication between UEs;

Sidelink uses uplink resources and a physical channel structure similar to uplink transmissions. However, some changes, noted below, are made to the physical channels;

The sidelink/D2D wireless access interface structure includes a physical sidelink control channel (PSCCH) for UEs to transmit control signaling to other UEs and a physical sidelink shared channel (PSSCH) for transmitting data to other UEs. Control messages transmitted on the PSCCH can indicate communications resources of the PSSCH via which the UE will transmit data to another UE. The control message for sidelink is referred to as sidelink control information (SCI). Therefore the PSCCH is mapped to the sidelink control resources and indicates resource and other transmission parameters used by a UE for PSSCH;

Sidelink transmission uses the same basic transmission scheme as the uplink transmission scheme. However, sidelink is limited to single cluster transmissions for all the sidelink physical channels. Furthermore, sidelink uses a one symbol gap at the end of each sidelink sub-frame. For V2X sidelink communication, PSCCH and PSSCH are transmitted in the same subframe;

The sidelink physical layer processing of transport channels differs from uplink transmission in the following steps:
Scrambling: for PSDCH and PSCCH, the scrambling is not UE-specific; and
Modulation: 256 QAM is not supported for sidelink 64 QAM is only supported for V2X sidelink communication;

For PSDCH (physical sidelink discovery channel), PSCCH and PSSCH demodulation, reference signals similar to uplink demodulation reference signals are transmitted in the fourth symbol of the slot in normal cyclic prefix (CP) and in the third symbol of the slot in extended cyclic prefix. The sidelink demodulation reference signals sequence length equals the size (number of sub-carriers) of the assigned resource. For V2X sidelink communication, reference signals are transmitted in the third and sixth symbols of the first slot and the second and fifth symbols of the second slot in normal CP;

For PSDCH and PSCCH, reference signals are created based on a fixed base sequence, cyclic shift and orthogonal cover code. For V2X sidelink communication, the cyclic shift for PSCCH is randomly selected in each transmission;

For in-coverage operation, the power spectral density of the sidelink transmissions can be influenced by the eNB; and For measurement on the sidelink, the following basic UE measurement quantities are supported:
Sidelink reference signal received power (S-RSRP);
Sidelink discovery reference signal received power (SD-RSRP);
PSSCH reference signal received power (PSSCH-RSRP); and
Sidelink reference signal strength indicator (S-RSSI).

Currently, for 5G or New Radio (NR) standardisation, a sidelink has been specified in Release-16 for V2X communication, with the LTE sidelink being a starting point for the NR sidelink For NR sidelink, the following sidelink physical channels are defined:
Physical Sidelink Shared Channel (PSSCH);
Physical Sidelink Broadcast Channel (PSBCH);
Physical Sidelink Control Channel (PSCCH); and
Physical Sidelink Feedback Channel (PSFCH).

Furthermore, the following sidelink physical signals are defined:
Demodulation reference signals (DM-RS);
Channel-state information reference signal (CSI-RS);
Phase-tracking reference signals (PT-RS);
Sidelink primary synchronization signal (S-PSS); and
Sidelink secondary synchronization signal (S-SSS).

NR sidelink can be enhanced with a power saving mechanism for sidelink which would be a useful feature especially for D2D (device-to-device) communications between devices having limited battery power.

A UE is provided by RRC signaling a bandwidth part (BWP) for SL transmissions (SL BWP) and a resource pool. This is typically done by the base station if the UE is in coverage or reachable by a relay node, but for some corner cases where it is known a UE will be or is likely to be out of coverage or reach by a base station, the SL BWP and resource pool may be hardcoded (preconfigured) onto the UE's SIM, for example. The resource pool is configured within the SL BWP. For the resource pool, the UE is provided a number of sub-channels where each sub-channel includes a number of contiguous physical resource blocks (PRBs). Sub-channels and PRBs are examples of frequency-divided regions. The sub-channel is defined as the minimum granularity in the frequency domain for transmission and reception of sidelink in the unit of PRB. The first PRB of the first sub-channel in the SL BWP is indicated. Hence the UE only needs to monitor those sub-channels that have been indicated, reducing the search space and number of blind decodes necessary at the UE. A slot is the time-domain granularity for a resource pool. Available slots for a resource pool are provided by RRC signaling and occur with a periodicity. For each periodicity, the RRC signaling may be bitmap signaling or indication of starting slot and length. A UE may be configured with an Rx (reception) resource pool and a Tx (transmission) resource pool separately. The Rx resource pool may be used for PSCCH monitoring at a Rx UE. Here, those skilled in the art would appreciate that a BWP (which is well known in the art as a power saving scheme for a UE) is a part of a carrier bandwidth providing a number of contiguous physical resource blocks (PRBs) which can be grouped to form a BWP in NR. Multiple BWPs can exist within a carrier bandwidth, but only one BWP is activated per UE at a given time.

Figure 10:
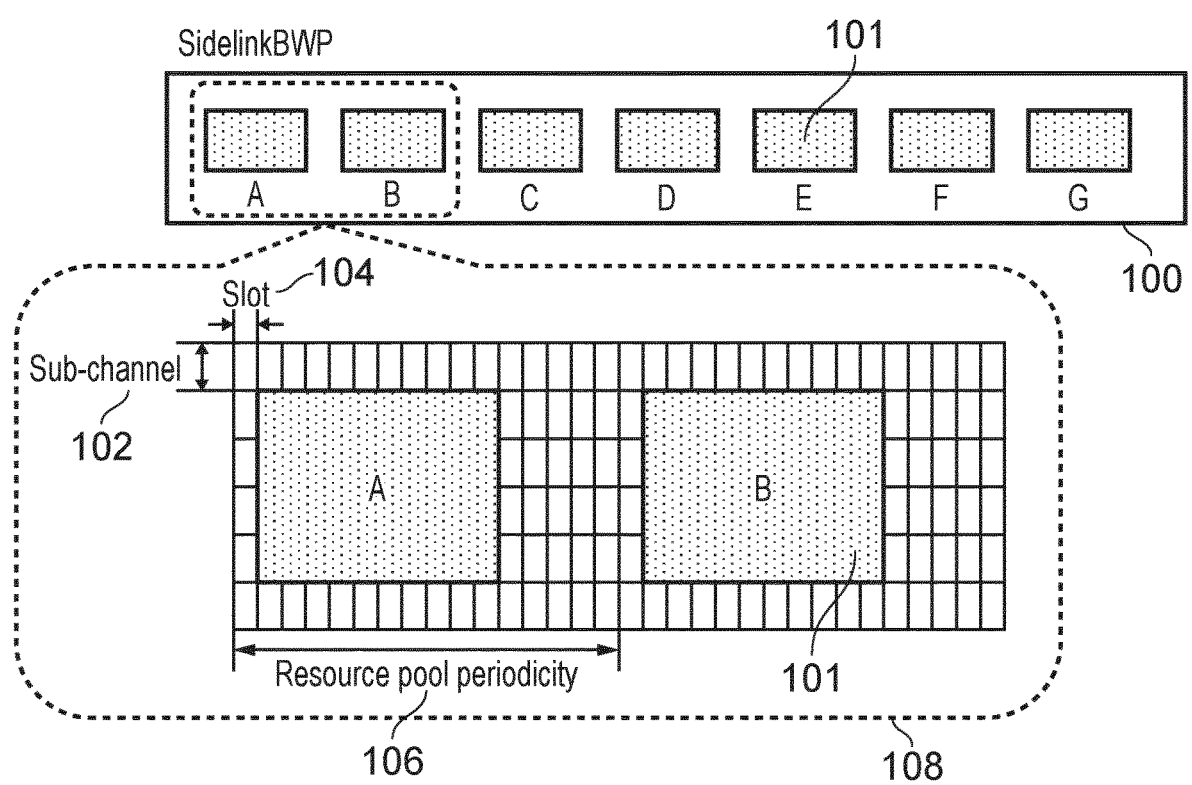
FIG. 10 shows an example of resource pool configuration for sidelink communications.

FIG. 10 shows an example of resource pool configuration in a sidelink BWP 100. Each instance of the resource pool 101 (labeled A to G) consists of four sub-channels 102 and ten slots 104 starting from the second slot of the resource pool periodicity, where the resource pool periodicity 106 is sixteen slots; i.e. the start of each instance of the resource pool 101 is sixteen slots from the start of the previous resource pool instance. Sidelink BWP portion 108 is a zoomed in portion of overall sidelink BWP 100, showing more clearly how two resource pool instances 101 (A and B) are made up from four sub-channels 102 and ten slots 104, with the periodicity 106 of sixteen slots being clearly seen. It should be noted that each instance of the resource pool within the periodicity may consist of non-contiguous slots in the time domain NR sidelink supports broadcast, groupcast and unicast (i.e. three "cast types" are supported). For SL broadcast, a UE transmits data to unspecified UEs which are close to the transmitter UE. The SL broadcast may be suitable for alert indication. For SL unicast, a UE transmits data to a specified UE. To realise the unicast transmission, SCI (sidelink control information) includes a destination ID (i.e. identifier of a receiver UE) and a source ID (i.e. identifier of a transmitter UE). For SL groupcast, a UE transmits data to one or more specified UEs within the same group. SL groupcast may be suitable for a platooning application which is a method for driving a group of vehicles together. To realise the groupcast transmission, SCI includes a destination group ID (i.e. identifier of a group to be received) and a source ID.

The UE needs to be able to save power in V2X. This is particularly relevant to pedestrian UEs, as these are typically connected to far smaller batteries than UEs which are implemented in vehicles. A new transmitter UE may wake up and wish to transmit something to a receiver UE while there is an ongoing transmission sequence between another transmitter UE and the receiver UE. Without having monitored a long history of the communication between that other transmitter UE and receiver UE, the new transmitter UE may be unaware of the power saving state of the receiver UE. In sidelink communications, receiver UEs may be operating in DRX mode or monitoring a restricted portion of the resource pool, and so there needs to be some mechanism for transmitter UEs to know the DRX/resource pool monitoring status (which is termed herein the "power saving state") of those receiver UEs. Embodiments of the present technique seek to provide solutions to such problems.

Informing Other UEs of Power Saving Status for Sidelink Communications

Figure 11:
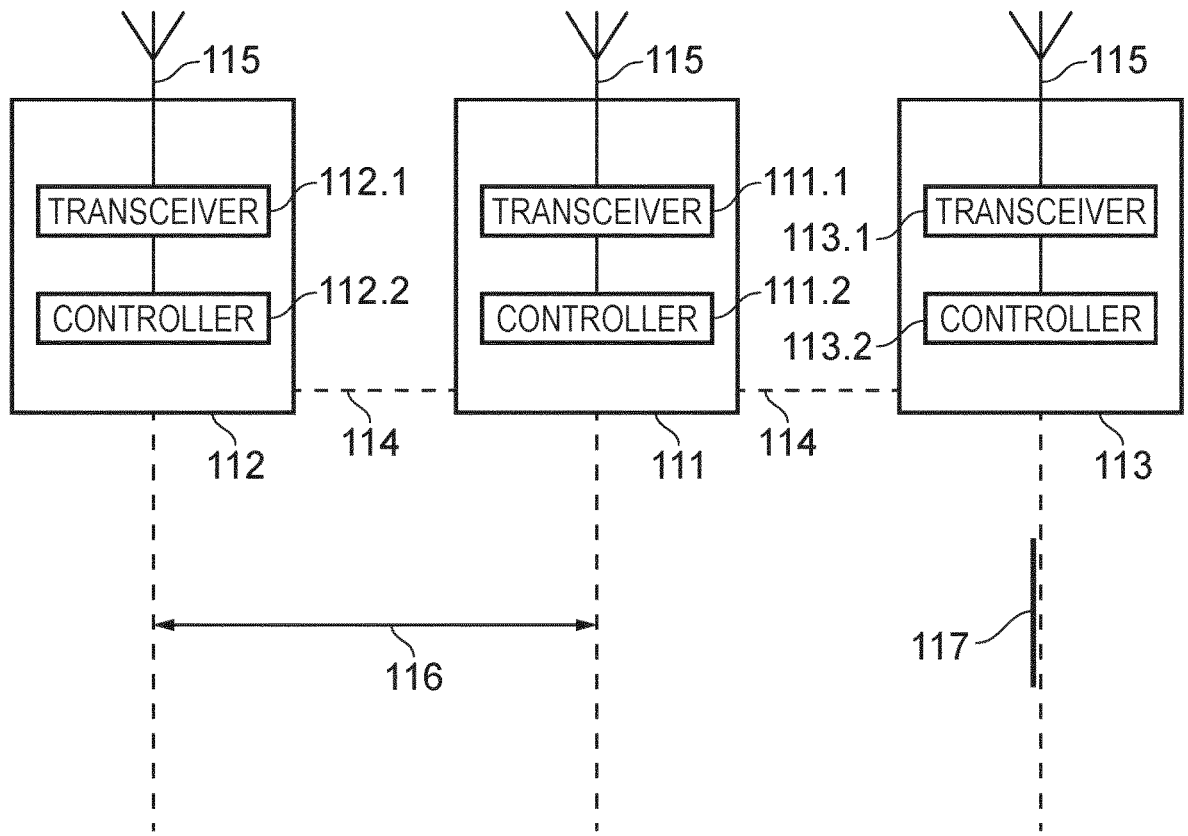
FIG. 11 shows a schematic representation of a wireless communications network comprising a communications device and an infrastructure equipment in accordance with embodiments of the present technique.

FIG. 11 shows a schematic representation of a wireless communications system comprising a plurality of communications devices 111, 112, 113 in accordance with embodiments of the present technique. The communications devices 111, 112, 113 each comprise a controller (or controller circuitry) 111.2, 112.2, 113.2, which may be, for example, a microprocessor(s), a CPU(s), a chip(s), or a dedicated chipset(s), etc.

The communications device 111, which is a receiving communications device 111, comprises a transceiver (or transceiver circuitry) 111.1 configured to receive signals from and/or to transmit signals to one or more of a plurality of other communications devices (such as communications device 112 and communications device 113) within sidelink communications resources of a plurality of instances of a resource pool of a sidelink interface 114, where the resource pool is formed of a plurality of time-divided slots and a plurality of frequency-divided regions. Each of the resource pool instances are arranged in time in accordance with a resource pool periodicity, and may be temporally discrete (i.e. each resource pool instance is separate in time) from the others of the resource pool instances, or there may be some temporal overlap between the resource pool instances.

Similarly, communications device 112, which is a first transmitting communications device (and which may be one of a plurality of other communications devices 112, 113 to the communications device 111), comprises a transceiver (or transceiver circuitry) 112.1 configured to receive signals from and/or to transmit signals to one or more of a plurality of other communications devices (such as communications device 111) within the sidelink communications resources of the plurality of instances of the resource pool of the sidelink interface 114.

Similarly, communications device 113, which is a second transmitting communications device (and which may be one of a plurality of other communications devices 112, 113 to the communications device 111), comprises a transceiver (or transceiver circuitry) 113.1 configured to receive signals from and/or to transmit signals to one or more of a plurality of other communications devices (such as communications device 111) within the sidelink communications resources of the plurality of instances of the resource pool of the sidelink interface 114.

It should be appreciated by those skilled in the art that the transceiver 111.1, the transceiver 112.1, and the transceiver 113.1 may each comprise a standalone transmitter and receiver (which are not shown in FIG. 11) capable of transmitting and receiving signals respectively. Furthermore, as shown in FIG. 11, each of the communications devices 111, 112, 113 may comprise a plurality of antennas 115 (only one is shown for each communications device 111, 112, 113 in FIG. 11 for the sake of simplicity) which are configured, in combination with the transceiver 111.1, 112.1, 113.1, to receive the signals from and/or to transmit the signals to the one or more other communications devices 111, 112, 113.

Essentially, at least some embodiments of the present technique propose that, during a communications session between a transmitter UE and a receiver UE, either of these transmitter and receiver UEs include information on a power saving state of the receiver UE in control signaling that is transferred between the transmitter UE and the receiver UE. In other words, the receiving communications device 111 and the first transmitting communications device 112 are configured to exchange control signaling 116, wherein the control signaling 116 comprises an indication of a current power saving status of the receiving communications device 111. Here, the power saving status is detectable 117 by at least the second transmitting communications device 113, the second transmitting communications device 113 having signals to transmit to the receiving communications device 111, wherein there may be no active communications session between the second transmitting communications device 113 and the receiving communications device 111. Here, whilst there may be no active communications session between the second transmitting communications device 113 and the receiving communications device 111, the second transmitting communications device 113 is still able to detect PSCCHs/PSSCHs/PSFCHs exchanged between the first transmitting communications device 112 and the receiving communications device 111, despite the second transmitting communications device 113 not being engaged in active communications with the receiving communications device 111 (or indeed the first transmitting communications device 112).

Therefore, in at least some arrangements of embodiments of the present technique, the second transmitting communications device 113 may then be configured to transmit the signals to the receiving communications device 111 in accordance with the current power saving status of the receiving communications device 111.

Figure 12:
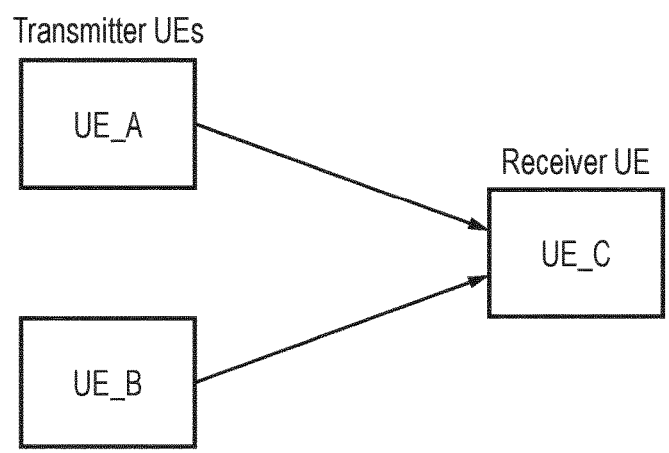
FIG. 12 shows a first arrangement of transmitting/receiving communications devices in accordance with at least some embodiments of the present technique.

FIG. 12 shows an arrangement of transmitting/receiving communications devices in accordance with at least some embodiments of the present technique. Here, there is one receiver UE, which is labeled (and referred to in further detail below) as UE_C, and two transmitter UEs which are labeled (and referred to in further detail below) as UE_A and UE_B. With reference to FIG. 11, UE_C can be deemed to be broadly equivalent to the communications device 111, UE_A can be deemed to be broadly equivalent to the communications device 112, and UE_B can be deemed to be broadly equivalent to the communications device 113. The receiver UE, UE_C, may save power whilst communicating with the first transmitter UE, UE_A, in accordance with a power saving status by operating in accordance with various DRX operations, and/or by monitoring a restricted set of resources, and/or by using a limited number of its antennas to monitor for signals carried by PSCCHs or PSSCHs (according to the various arrangements of the embodiments of the present technique described below). The second transmitter UE, UE_B, may detect the power saving status of UE_C while it communicates with UE_A, and will then know how to itself communicate with UE_C in accordance with UE_C's current power saving status. Certain aspects of the arrangements of embodiments of the present technique described below explain in further detail how the transmitter UEs, UE_A and UE_B, can know the current power saving status the receiver UE, UE_C, which resources the receiver UE, UE_C, is monitoring, and how the transmitter and receiver UEs can know the behaviour of each of the other of these UEs.

As mentioned briefly above, the power saving status of the receiver UE, UE_C, can include one or more of the following aspects of operation:

The resource pool instances that the receiver UE is monitoring. It should be noted that some resource pool instances may be monitored if the receiver UE is in an "awake phase" and the receiver UE, UE_C, might not monitor other resource pool instances (in the case that the receiver UE, UE_C, is in a "sleep phase");

The DRX parameters of current operation of the receiver UE, which includes:
  Whether the receiver UE is operating in a short DRX cycle or a long DRX cycle;
  Inactivity timer state (e.g. how long the inactivity timer will run for (which may be in terms of number of resource pool instances, number of slots, or time)); and
  Short DRX timers (e.g. the number of short DRX cycles which the UE will monitor in the future);

The DRX parameters configured for the receiver UE, e.g. On duration timer, Inactivity timer, Long DRX cycle, and/or Short DRX cycle;

The timeslots within a resource pool that the receiver UE, UE_C, is monitoring;

The frequency resources (sub-channels) within a resource pool that the receiver UE, UE_C, is monitoring; and The number of antennas (antenna ports) that the receiver UE, UE_C, is using to monitor for PSCCH when UE_C is in an "awake phase".

The control signaling may be transmitted by the first transmitting communications device to the receiving communications device (for example via one of a Physical Sidelink Control Channel, PSCCH, and a Physical Sidelink Shared Channel, PSSCH). Here, the power saving status may have been previously indicated, as part of the control signaling, to the first transmitting communications device by the receiving communications device. Alternatively, or additionally, the control signaling may be transmitted by the receiving communications device to the first transmitting communications device (for example via a Physical Sidelink Feedback Channel, PSFCH).

Power Saving Status Comprises DRX Operation

As described above, it is possible that while one transmitter UE, UE_A, is communicating with a receiver UE, UE_C, another transmitter UE, UE_B, may also want to communicate with the receiver UE, UE_C. In such a case, when there is an ongoing communication stream between UE_A and UE_C, that other UE, UE_B, may need to know the DRX state of the receiver UE, UE_C. Once the potential transmitter UE, UE_B, knows the DRX state of the receiver UE, UE_C, it can itself transmit using resource pool instances that UE_C will actually receive, and not using resource pool instances that UE_C will be asleep for.

In an arrangement of embodiments of the present technique, a transmitter UE, UE_A, may include the DRX configuration of the receiver UE, UE_C, which it is communicating with, in either the PSCCH or PSSCH messages that are sent to the receiver UE. In other words, the power saving status comprises a discontinuous reception, DRX, operation of the receiving communications device. Another UE, UE_B, that intends to communicate with the receiver UE, UE_C, can determine the DRX state of the receiver UE by monitoring the PSCCH/PSSCH messages between UE_A and UE_C and then communicate with the receiver UE using resources that are consistent with those monitored PSCCH/PSSCH messages.

Here, it is the transmitter UE, UE_A, which signals the DRX operation of the receiver UE, UE_C. UE_A should know the DRX operation of UE_C due to its ongoing communication with UE_C. However, in at least some arrangements of embodiments of the present technique, UE_A may actually dictate to UE_C what its DRX operation should be, either based on decisions made by UE_A itself or by relaying decisions made by the network. Here, in other words, the receiving communications device is configured to receive the control signaling from the first transmitting communications device, wherein the control signaling comprises an indication of the DRX operation, the indication indicating to the receiving communications device to operate in accordance with the DRX operation.

Those skilled in the art would understand, as has been described in detail above with reference to FIGS. 4 to 8, the DRX operation of a UE could comprise long DRX operation, short DRX operation, and the use of timers such as the inactivity timer. In other words, the DRX operation comprises one or more of: a primary DRX operation (e.g. long DRX) in which the receiving communications device is configured, in accordance with a first periodic rate (e.g. the long DRX cycle), to switch between an active monitoring state (e.g. DRX_ON) in which the receiving communications device monitors for signals received by the one or more of the other communications devices and a reduced power state (e.g. DRX_OFF) in which the receiving communications device does not monitor for signals received by the one or more of the other communications devices, a secondary DRX operation (e.g. short DRX) in which the receiving communications device is configured, in accordance with a second periodic rate (e.g. the short DRX cycle) which is higher than the first periodic rate, to switch between the active monitoring state and the reduced power state, and an inactivity timer operation in which the receiving communications device is configured, for the duration of an inactivity period defined by an inactivity timer started upon reception of a signal by the receiving communications device, to stay in the active operating state.

Figure 13:
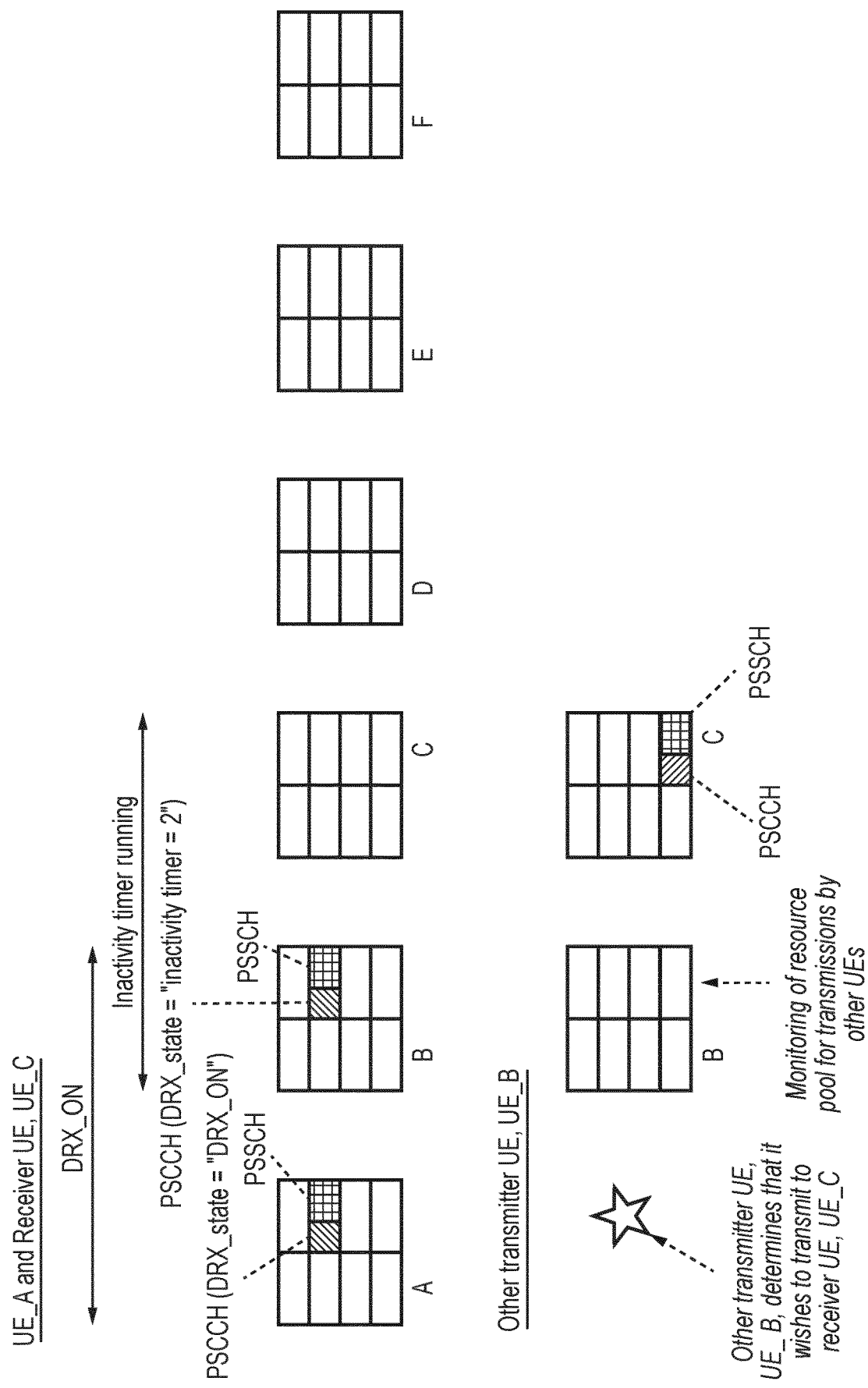
FIG. 13 illustrates an example of how a transmitter UE may monitor transmissions from other transmitting devices to an intended receiver UE, including an indication of DRX state information of the receiver UE, before transmitting itself in accordance with embodiments of the present technique.

FIG. 13 shows operation according to such an arrangement. FIG. 13 shows the following functionality in different instances of the resource pool:

A: Receiver UE, UE_C, enters the DRX_ON phase of DRX operation. The times at which UEs are in the DRX_ON phase may be known to all UEs, e.g. via RRC configuration;

A: Transmitter UE, UE_A, sends PSCCH/PSSCH to the receiver UE, UE_C. The PSCCH indicates the DRX state of UE_C (as known by UE_C), which is that UE_C is simply monitoring PSCCH during the DRX_ON phase of the long DRX cycle. The PSCCH also indicates some PSSCH resource that is transmitted to the receiver UE;

A: Receiver UE, UE_C, starts an inactivity timer, where in this example it is assumed that the inactivity timer runs for two resource pool instances;

A: The other transmitter UE, UE_B, determines that it wishes to transmit to the receiver UE, UE_C;

B: Transmitter UE, UE_C, sends further data to the receiver UE, UE_C. This data is scheduled using PSCCH and is transmitted on PSSCH. The PSCCH indicates that the DRX state of the receiver UE is "inactivity timer=2", i.e. that the inactivity timer is running for a period of 2 resource pool instances;

In some implementations, if the receiver UE, UE_C, receives an incorrect indication of its DRX state, it sends a correction of its DRX state to UE_A in a feedback message, such as PSFCH;

B: The other transmitter UE, UE_B, monitors the PSCCH transmitted from UE_A and determines that the inactivity timer of the receiver UE, UE_C, is running Hence UE_B determines that the receiver UE will be active during the subsequent resource pool, due to the running of the inactivity timer;

C: Since UE_B is aware that the inactivity timer is running at the receiver UE, UE_C, UE_B sends its data to the receiver UE, UE_C, via PSCCH/PSSCH; and D,E,F: no further activity.

It should be noted that, for the sake of simplicity, FIG. 13 does not show the inactivity timer being re-started multiple times (e.g. due to the PSCCH/PSSCH activity in resources pool instances B and C). However, in such a case, the following changes to inactivity timer operation would occur (not shown in FIG. 13):

B: inactivity timer re-started due to reception of PSCCH from UE_A, so that it would run for resource pool instances C and D;

C: inactivity timer re-started due to reception of PSCCH from UE_B, so that it would run for resource pool instances D and E; and F: inactivity timer expires and UE goes to sleep since there was no PSCCH activity in D, E.

In another arrangement of embodiments of the present technique, a receiver UE, UE_C, includes its DRX configuration in response to either the PSCCH or PSSCH messages that are sent by the transmitter UE, UE_A, to it. That is, the receiver UE signals the DRX configuration. This response message could for example be signaled in a PSFCH (Physical Sidelink Feedback Channel). Another UE, UE_B, that intends to communicate with the receiver UE, UE_C, can determine the DRX state of the receiver UE by monitoring the response messages (e.g. PSFCH) between UE_C and UE_A and then communicating with the receiver UE using resources that are consistent with those indicated in the response message.

Figure 17:
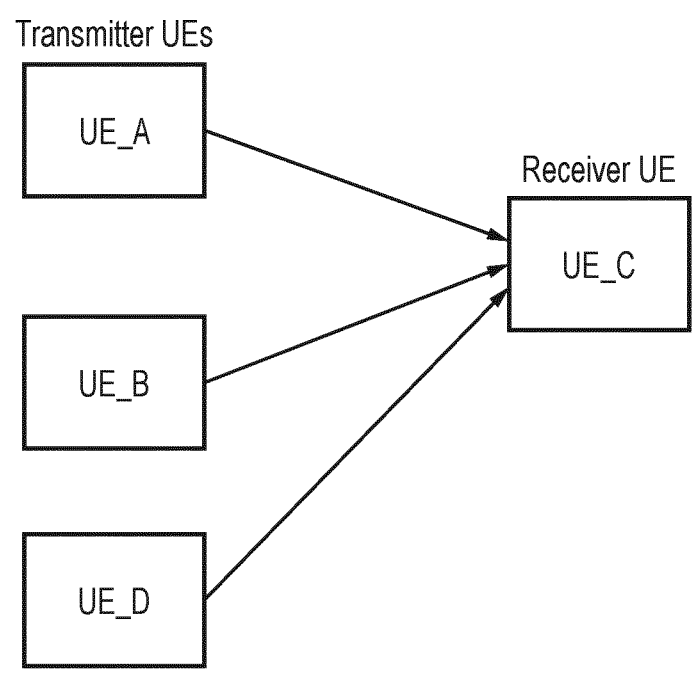
FIG. 17 shows a second arrangement of transmitting/receiving communications devices in accordance with at least some embodiments of the present technique.

As described above, UE_A may dictate to UE_C what its DRX operation should be, either based on decisions made by UE_A itself or by relaying decisions made by the network. Here, in other words, the receiving communications device is configured to receive the control signaling from the first transmitting communications device, wherein the control signaling comprises an indication of the DRX operation, the indication indicating to the receiving communications device to operate in accordance with the DRX operation. It should be noted that this behaviour is not shown in FIG. 13. It is conceivable that another UE (for example UE_B or UE_D as shown in FIG. 17 and described below) may also be in communication with UE_C, and may try to signal that UE_C should operate in accordance with a certain DRX operation which conflicts with that signaled by UE_A. Here, UE_C may be configured to operate in accordance with the transmitting UE with which it has been engaged in communications for the longest (i.e. UE_A) or may update its DRX behaviour in accordance with the most recently received instructions (e.g. from UE_B or UE_D). Alternatively, UE_C may resolve such conflicts by ignoring instructions from these transmitting UEs, and operating in accordance with a default or previous DRX configuration which is signaled to each of the transmitting UEs by UE_C. Alternatively, UE_C may resolve such conflicts by operating using the superset of the indicated DRX configurations from the transmitter UEs, i.e. UE_C controls its receiver to receive sidelink signals when any one of the indicated multiple DRX configurations indicate that UE_C should receive or monitor sidelink signals.

Those skilled in the art would understand, as has been described above with reference to FIG. 13, the DRX operation of a UE could comprise long DRX operation, short DRX operation, and the use of timers such as the inactivity timer. In other words, the DRX operation comprises one or more of: a primary DRX operation (e.g. long DRX) in which the receiving communications device is configured, in accordance with a first periodic rate (e.g. the long DRX cycle), to switch between an active monitoring state (e.g. DRX_ON) in which the receiving communications device monitors for signals received by the one or more of the other communications devices and a reduced power state (e.g. DRX_OFF) in which the receiving communications device does not monitor for signals received by the one or more of the other communications devices, a secondary DRX operation (e.g. short DRX) in which the receiving communications device is configured, in accordance with a second periodic rate (e.g. the short DRX cycle) which is higher than the first periodic rate, to switch between the active monitoring state and the reduced power state, and an inactivity timer operation in which the receiving communications device is configured, for the duration of an inactivity period defined by an inactivity timer started upon reception of a signal by the receiving communications device, to stay in the active operating state.

Figure 14:
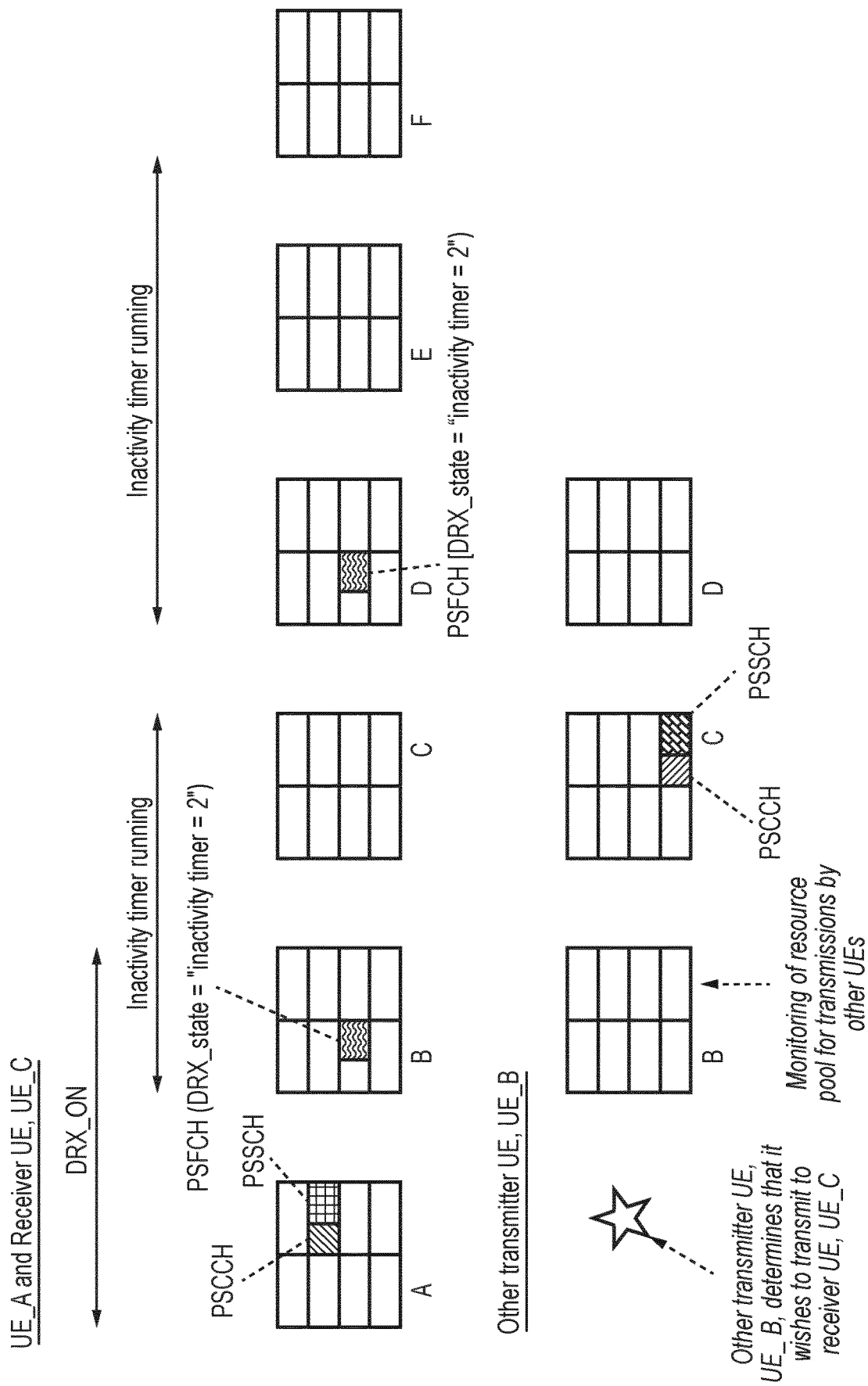
FIG. 14 illustrates an example of how a receiver UE may send DRX state information of the receiver UE in response signaling to a transmitter UE to in accordance with embodiments of the present technique.

Operation according to such an arrangement of the invention is illustrated in FIG. 14 and is described below:

A: Receiver UE, UE_C, enters the DRX_ON phase of DRX operation. The times at which UEs are in the DRX_ON phase may be known to all UEs, e.g. via RRC configuration;

A: Transmitter UE, UE_A, sends PSCCH/PSSCH to the receiver UE, UE_C. The PSCCH indicates some PSSCH resource that is transmitted to the receiver UE;

A: Receiver UE, UE_C, starts an inactivity timer, where in this example it is assumed that the inactivity timer runs for two resource pool instances;

A: The other transmitter UE, UE_B, determines that it wishes to transmit to the receiver UE, UE_C;

B: Receiver UE, UE_C, responds to the PSCCH or PSSCH with a PSFCH, where the PSFCH includes an indication of the DRX state of the receiver UE. In this example, the PSFCH indicates that the inactivity timer for UE_C is running for 2 resource pool instances;

In an implementation, the indication of DRX state is carried in a PSFCH in response to the PSSCH, i.e. it is carried in response to the sidelink shared data channel. The PSFCH can also contain ACK/NACK information related to that PSSCH;

In another implementation, the indication of DRX status is carried in a PSFCH in response to the PSCCH, i.e. it is carried in response to the sidelink control channel. In this case, the UE might send two PSFCHs to the transmitter UE at two different times:
PSFCH1: Contains DRX state of the receiver UE; or
PSFCH2: Contains ACK/NACK and/or CSI (Channel State Information) feedback from the receiver UE;
In either of the above described implementations, when transmitting DRX state information in a PSFCH, the PSFCH might be transmitted with a wider beam than for the case when DRX status information is not included. This wider beam transmission is helpful for another transmitter UE, UE_B, which might wish to transmit to the receiver UE, UE_C, using a beam in a different direction. It should be noted that transmission using a wider beam could be effected by beam sweeping a narrow beam across the path of a wider beam (e.g. the functionality of a 60 degree wider beam could be effected by the transmission of two 30 degree narrower beams);
B: The other transmitter UE, UE_B, monitors the PSFCH transmitted from UE_C and determines that the inactivity timer of the receiver UE, UE_C, is running Hence UE_B determines that the receiver UE will be active during the subsequent resource pool, due to the running of the inactivity timer;
C: Since UE_B is aware that the inactivity timer is running at the receiver UE, UE_C, UE_B sends its data to the receiver UE, UE_C, via PSCCH/PSSCH;
C: UE_C re-starts its inactivity timer;
D: Receiver UE responds to transmission from UE_B with a PSFCH indicating the DRX state of receiver UE, UE_C. The PSFCH indicates that the inactivity timer is running for 2 resource pool instances;
E: No activity. Inactivity timer expires; and
F: Receiver UE, UE_C, goes to sleep since its inactivity timer has expired.

Power Saving Status Comprises Monitoring of a Subset of Sidelink Resources

In some arrangements of embodiments of the present technique, a receiver UE, UE_C, may save power by only monitoring a restricted portion of the resource pool. In other words, the power saving status comprises a restricted resource pool monitoring operation of the receiving communications device, wherein, when operating in accordance with the restricted resource pool monitoring operation, the receiving communications device is configured to monitor for one or more current signals transmitted by the first transmitting communications device to the receiving communications device in a subset of the time-divided slots and the frequency-divided regions of the resource pool during at least a first of the resource pool instances. In some arrangements of embodiments of the present technique, this restricted portion of the resource pool may comprise those resources within which signals had previously been communicated to UE_C. In other words, the subset is dependent on in which of the time-divided slots and the frequency-divided regions of the resource pool one or more previous signals were received by the receiving communications device from the first transmitting communications device during a second of the resource pool instances (during which the receiving communications device may be configured to monitor all of the time-divided slots and all the of frequency-divided regions of the resource pool, or may be configured to monitor a larger subset comprising a larger number of the time-divided slots and a larger number the frequency-divided regions of the resource pool, where the larger subset comprises the initial, smaller subset), wherein the second resource pool instance is a preceding resource pool instance to the first resource pool instance.

Assuming that a first transmitter UE, UE_A, had been communicating with the receiver UE, UE_C, there may need to be a mechanism for a second transmitter UE, UE_B, to determine those resources that the first transmitter UE, UE_A, had been using; as it may be that UE_C will only be monitoring these resources following a transmission received by UE_C from UE_A. The second transmitter UE, UE_B, may then be able to determine the resources that it should use to communicate with the receiver UE, UE_C. The following examples describe mechanisms to allow UE_B to determine the resources that UE_A is monitoring.

As described above, the receiver UE, UE_C, may monitor a restricted amount of physical resource within a resource pool if signals were previously communicated to UE_C within those limited physical resources. In other words, the time-divided slots and the frequency-divided regions of the subset are the same as the time-divided slots and the frequency-divided regions of the resource pool in which the one or more previous signals were received during the second resource pool instance. It may be that the receiver UE does not monitor the exact same resources as those within which it was previously communicated to, but may monitor a limited amount of the resources of the entire resource pool which comprises the resources with which it was previously communicated to. Alternatively, the receiver UE may monitor a subset of resources which is a function (e.g. a time hopping function where the monitored resources are the same as those previously monitored by shifted by one or more time slots of the resource pool or a frequency hopping function where the monitored resources are the same as those previously monitored shifted by one or more PRBs or subframes of the resource pool) of those resources with which it was previously communicated to.

If no communication is received by the receiver UE in the restricted set of resources during a resource pool instance while these restricted resources are being monitored by the receiver UE, the receiver UE may deduce that the current transmission has ended, and thus returns to monitoring the entire resource pool for signals from other UEs. In other words, if the receiving communications device does not receive any of the one or more current signals in the subset during the first resource pool instance, the receiving communications device is configured to monitor a larger number of the time-divided slots of the resource pool than in the subset and/or a larger number of the frequency-divided regions of the resource pool than in the subset for one or more next signals during at least a third of the resource pool instances, wherein the third resource pool instance is a subsequent resource pool instance to the at least the first resource pool instance. Here, when monitoring this larger number of time-divided slots/frequency-divided regions, the receiving communications device may be configured to monitor the entire resource pool (i.e. all of the time-divided slots and all of the frequency-divided regions), or the receiving communications device may be configured to monitor a larger subset of the resource pool, where this larger subset comprises the subset.

Figure 15:
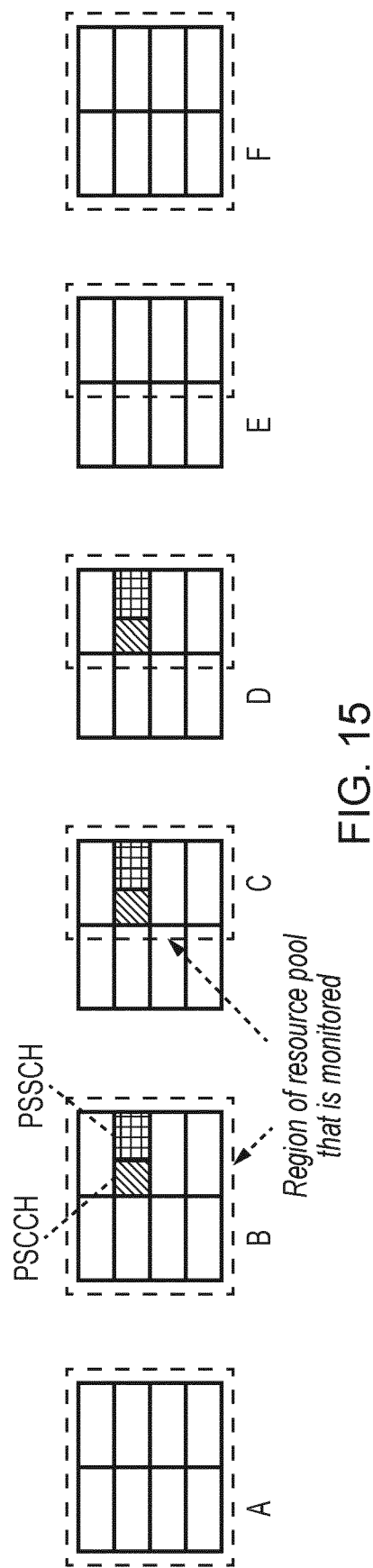
FIG. 15 illustrates an example of how a UE may monitor a subset of time-slots of a resource pool within which it was previously communicated to in accordance with embodiments of the present technique.

An example is shown in FIG. 15. FIG. 15 shows the receiver UE, UE_C, monitoring the same slot within a resource pool within which signals were last communicated to UE_C. Here, in other words, the subset comprises all of the plurality of frequency-divided regions of the resource pool and only the time-divided slots of the resource pool in which the one or more previous signals were received during the second resource pool instance. Those skilled in the art would of course appreciate that UE_C could, instead of the example of FIG. 15, monitor the same frequency-divided regions (instead of slot) within the resource pool that it was last communicated within (i.e. the subset may comprise all of the plurality of time-divided slots of the resource pool and only the frequency-divided regions of the resource pool in which the one or more previous signals were received during the second resource pool instance).

FIG. 15 shows the following behaviour, where a resource pool consists of 2 timeslots and 4 PRBs (where a PRB is one example of a frequency-divided region):

A: UE_C has not previously been communicated with and monitors the entire resource pool.

B: UE_C monitors entire resource pool. In this instance, a transmitter UE, UE_A, communicates with UE_C on PSCCH and PSSCH using resources in slot 2 of the resource pool.

C, D: UE_C only monitors PSCCH/PSSCH in slot 2 of the resource pool, since slot 2 was used for communication in the previous instance of the resource pool. UE_C receives PSCCH/PSSCH.

E: The UE_C only monitors PSCCH/PSSCH in slot 2, since these are the resources that were used for communication in the previous instance of the resource pool. UE_C does not receive any communication in these resources.

F: UE_C monitors the entire resource space since it did not receive any communication in the previous instance of the resource pool.

It should be appreciated that the receiver UE, UE_C, is able to reduce power consumption in this case by either switching off for a longer period of time (in the example FIG. 15 the UE_C's receiver is only activated for one out of two slots in instances C, D, E) or being able to operate with a narrower receiver bandwidth.

Figure 16:
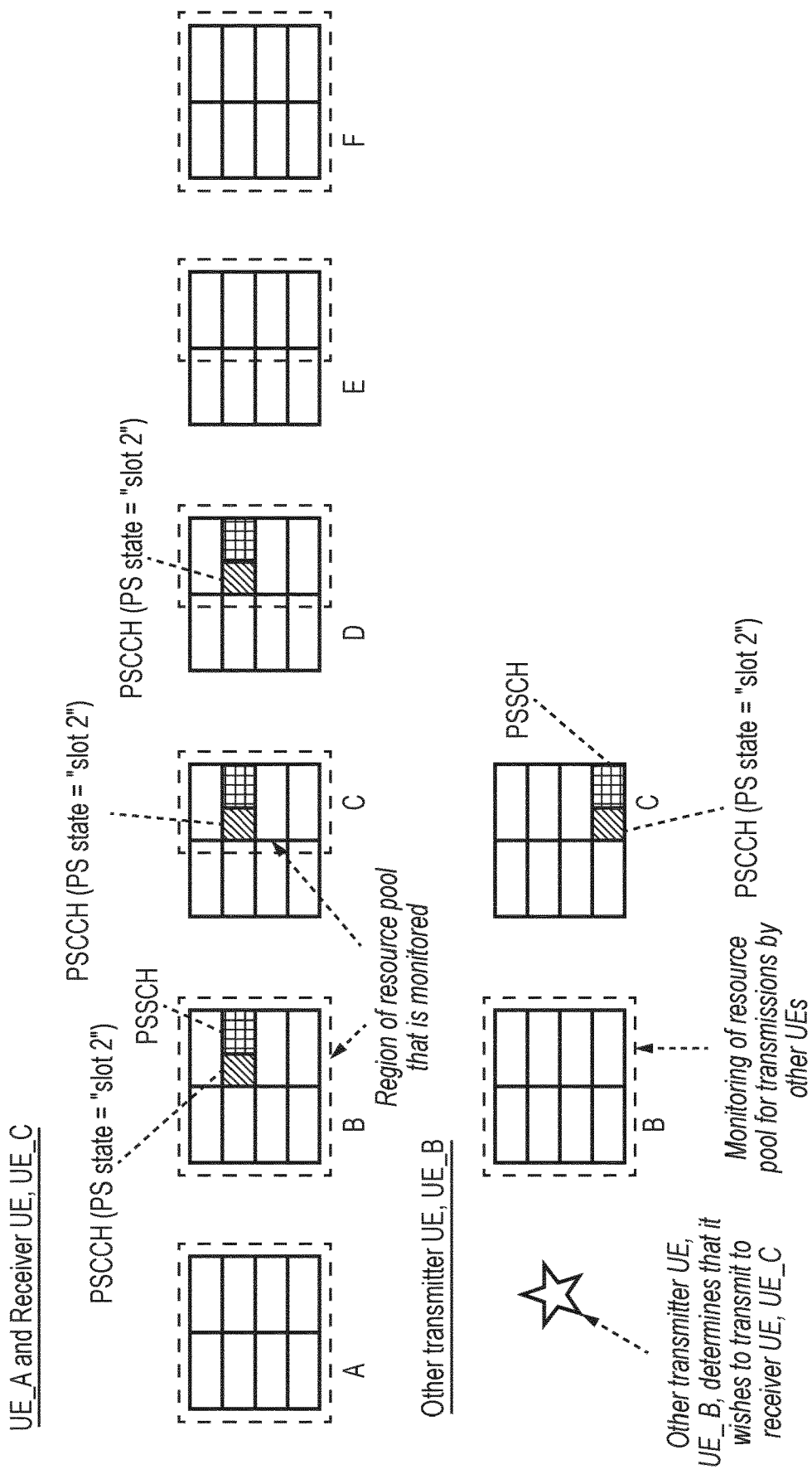
FIG. 16 illustrates an example of how a transmitter UE may monitor transmissions from other transmitting devices to an intended receiver UE, including an indication of resources being monitored by the receiver UE, before transmitting itself in accordance with embodiments of the present technique.

Once the potential transmitter UE, UE_B, knows which resources a receiver UE, UE_C, is monitoring, it can itself transmit using those resources. FIG. 16 shows operation according to some implementations of such an arrangement of embodiments of the present technique. Here, it is the current transmitting UE, UE_A, that indicates (e.g. in PSCCH or PSSCH) the resources that the receiver UE, UE_C is monitoring. FIG. 16 shows the following functionality in different instances of the resource pool:

A: receiver UE, UE_C, monitors the entire resource pool since there has not been prior communication to UE_C;

A: A transmitter UE, UE_B, determines that it has data to send to the receiver UE, UE_C;

B: Another transmitter UE, UE_A, transmits PSCCH/PSSCH to the receiver UE, UE_C, in slot 2 of the resource pool. UE_A indicates in the PSCCH (with the information "PS state="slot 2"") that the receiver UE, UE_C, will monitor slot 2 of the resource pool as a consequence of UE_A's transmission;

B: UE_B monitors the resource pool and determines that the receiver UE, UE_C, will be monitoring the second slot in the next instance of the resource pool based on receiving the PSCCH from UE_A indicating ('PS state="slot 2"') that UE_C will monitor slot 2 of the resource pool as a consequence of UE_A's transmission;

C: UE_B uses resources in the second slot to transmit to the receiver UE, UE_C. UE_B also indicates in its PSCCH, via the information 'PS state="slot 2"', that UE_C will monitor slot 2 of the resource pool as a consequence of UE_B's transmission;

C: receiver UE, UE_C, receives two sidelink communications (from the two transmitting UEs, UE_A and UE_B) in the second slot of the resource pool;

D: UE_B stops transmitting to the receiver UE, UE_C (e.g. due to there being no more data to transmit);

E: UE_C monitors the second slot of the resource pool since that second slot was used in instance D. There is no communication to UE_C in instance D; and F: Since there was no communication to UE_C in instance E, the UE monitors the whole of resource pool instance F.

Based on such implementations, a UE that wishes to transmit will listen to PSCCH messages from other UEs to determine which resources the receiver UE, UE_C, is going to monitor. Another transmitter UE, UE_D, can then perform an "OR" function to determine the whole set of resources that the receiver UE, UE_C, will monitor. For example, consider the communication scenario shown in FIG. 17. This scenario has three transmitter UEs, UE_A, UE_B and UE_D, which each potentially want to transmit to a receiver UE, UE_C. In other words, the second transmitting communications device (i.e. UE_D, where UE_A is the first transmitting communications device, UE_B is a third transmitting communications device, and UE_C is the receiving communications device) is configured to determine that the receiving communications device, when operating in accordance with the restricted resource pool monitoring operation, is monitoring for one or more second current signals transmitted by a third transmitting communications device of the plurality of communications devices to the receiving communications device in a second subset of the time-divided slots and the frequency-divided regions of the resource pool during at least the second resource pool instance, to perform a logical OR function on the first subset (comprising the resources used by UE_A) and the second subset (comprising the resources used by UE_B), and to determine, based on a result of the logical OR function, a third subset of the time-divided slots and the frequency-divided regions of the resource pool within which the second transmitting communications device is to transmit the signals to the receiving communications device during at least the first resource pool instance. It should be appreciated by those skilled in the art that the first and second subsets may be different, or may partially overlap, or indeed may comprise the exact same resources as one another. It would be clear to those skilled in the art that the logical OR operation performed by UE_D effectively returns all resources in either of the first subset or the second subset, whether these resources are common to both UE_A and UE_B's transmissions or not. As with the first subset and described above, the second subset may be based on having received previous signal(s) in those resources, and the resources of the second subset may be the same as, related to, or a function of such resources, in the same manner as described for the first subset.

Figure 18:
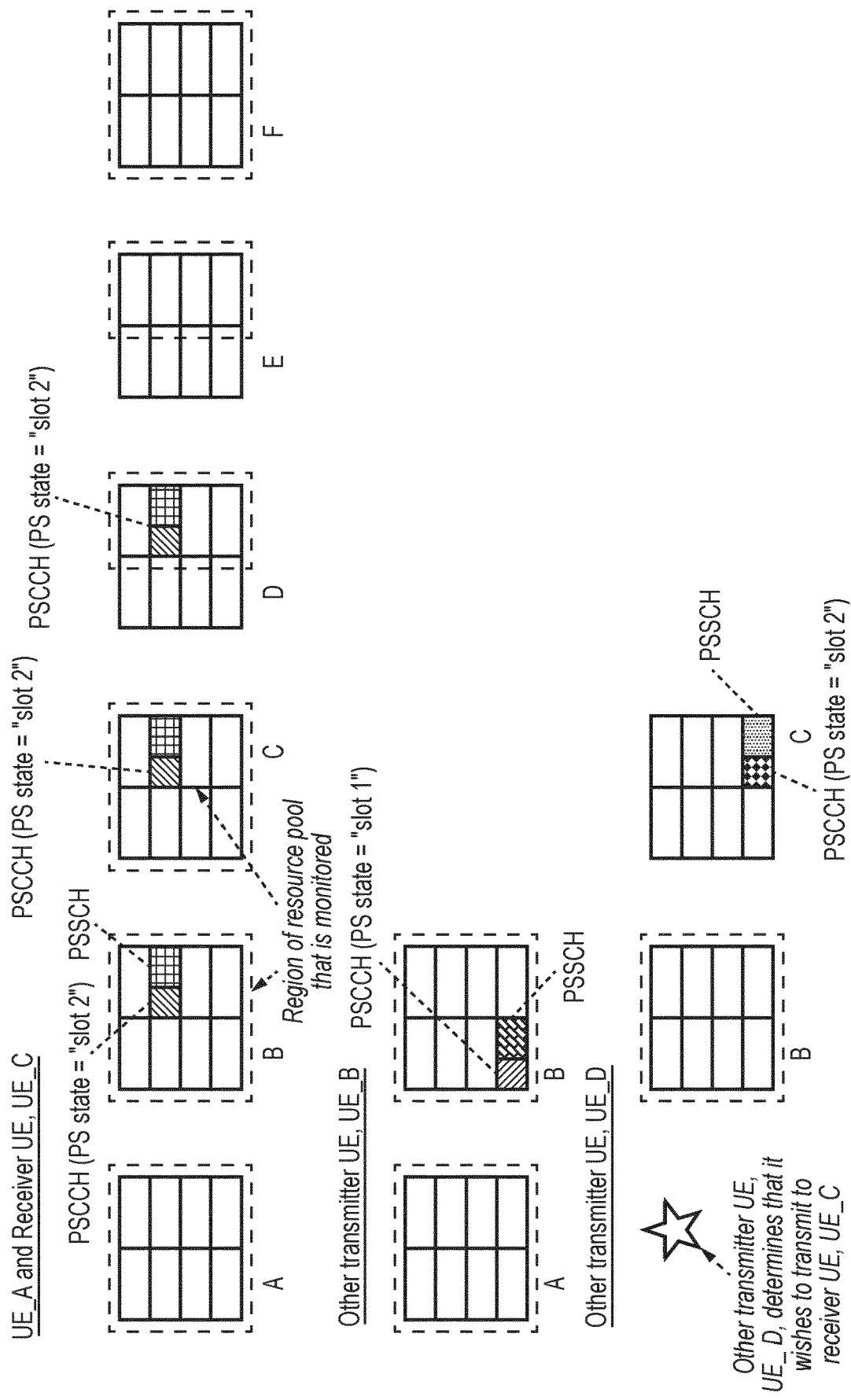
FIG. 18 illustrates an example of how a transmitter UE may apply a logical OR function to determine resources monitored by a receiver UE.

Such a method of implementing a logical "OR" function by a third transmitter UE, UE_D, to determine the resources that a receiver UE, UE_C, will be monitoring, is shown in FIG. 18. FIG. 18 shows the following behaviour:

A: Transmitter UEs UE_A and UE_B have data to transmit and monitor the resources in the resource pool to determine which resources the receiver UE, UE_C, will be monitoring. There are no transmissions in A, hence it is determined that the receiver UE, UE_C, will monitor the whole resource pool in instance B;

A: Third UE, UE_D, determines that it has data to transmit to the receiver UE, UE_C;

B: UE_A transmits to receiver UE, UE_C, in slot 2 and indicates in the PSCCH that "PS state=slot 2";

B: UE_B transmits to receiver UE, UE_C, in slot 1 and indicates in the PSCCH that "PS state=slot 1";

B: Transmitter UE, UE_D, monitors the resource pool in order to determine which resources the receiver UE, UE_C, will monitor in the next instance of the resource pool;

B: UE_D detects the PSCCH from UE_A indicating "PS state=slot 2" and the PSCCH from UE_B indicating "PS state=slot 1". UE_D performs an "OR" function on these two pieces of information and hence determines that the receiver UE, UE_C, will monitor both slots 1 and 2 in instance C;

C: UE_A continues to transmit in slot 2 of the resource pool;

C: UE_D has a choice between slots 1 and 2 of the resource pool instance to transmit and it chooses slot 2. It hence transmits PSCCH/PSSCH in slot 2 of the resource pool;

D: UE_A transmits PSCCH/PSSCH in slot 2 of the resource pool, knowing that the receiver UE, UE_C, will be monitoring slot 2 of the resource pool;

D: UE_B and UE_D stop transmission as they have no further data to transmit; and E,F: Further behaviour may be similar to that described with respect to FIG. 16.

Hence, in such arrangements of embodiments of the present technique as described above, a potential transmitter UE may determine the resources that the receiver UE, UE_C, will monitor based on appraisal of all of the PSCCH that it receives/detects from other transmitting UEs.

Figure 19:
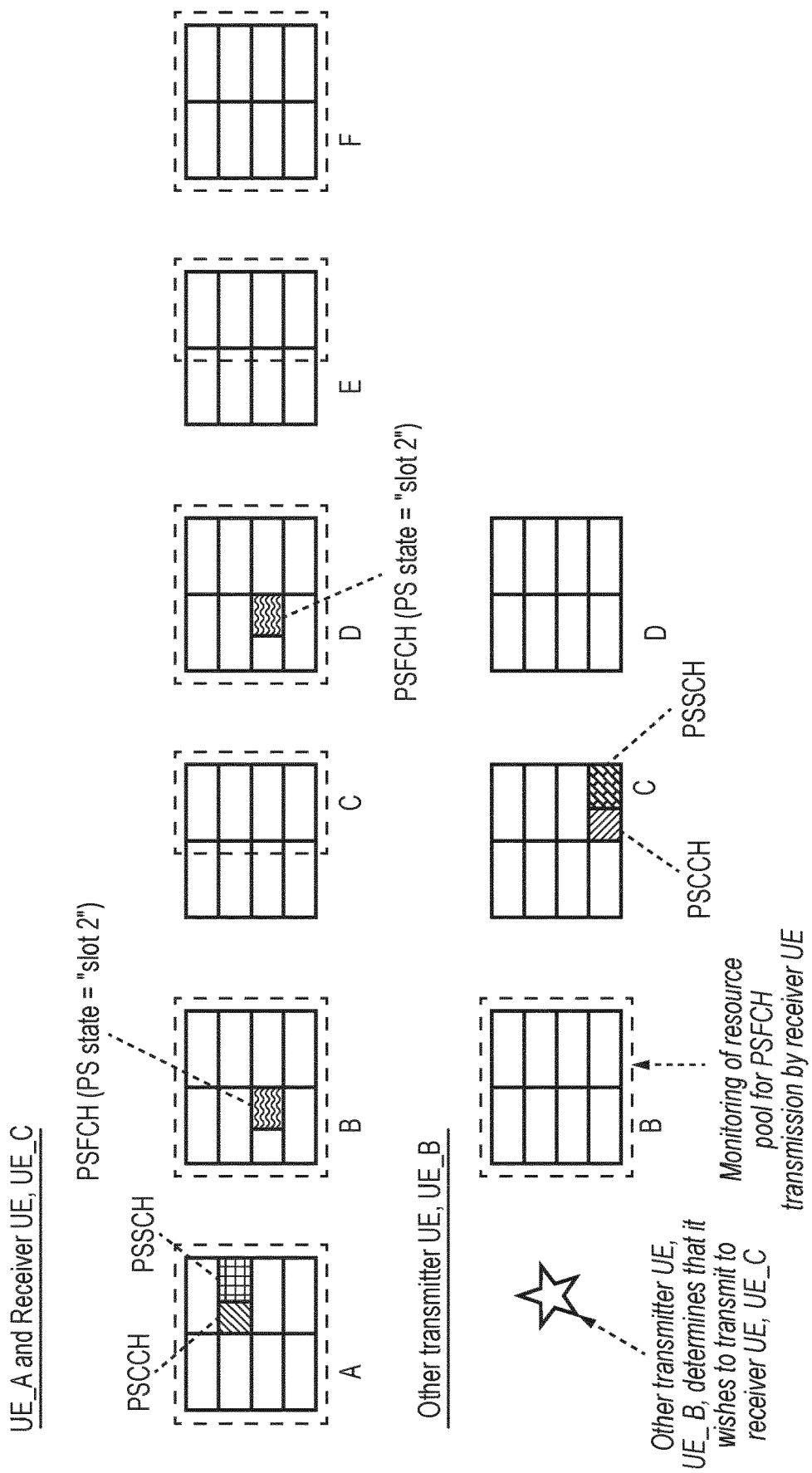
FIG. 19 illustrates an example of how a receiver UE may transmit an indication of resources being monitored by the receiver UE to a transmitter UE in accordance with embodiments of the present technique.

Above, it is described with respect to FIG. 16 how PSCCH transmissions from the transmitter UE could indicate to other potential transmitter UEs information on the DRX state of the receiver UE, where in the example of FIG. 16, it is the current transmitting UE, UE_A, that indicates (e.g. in PSCCH or PSSCH) the resources that the receiver UE, UE_C is monitoring. In another, related, implementation of such arrangements of embodiments of the present technique involving restricted resource monitoring, the receiver UE, UE_C may indicate the resources that it is monitoring. Here, UE_C could use PSFCH to indicate which resources it is going to monitor in the following instance of the resource pool. Another transmitter UE, UE_B, that intends to transmit to the receiver UE, UE_C, would then monitor these PSFCH transmissions and then determine appropriate resources to use to communicate with the receiver UE, UE_C. Functionality according to this implementation is illustrated in FIG. 19 and is described further below:

A: Receiver UE, UE_C, monitors the whole resource pool (e.g. because there has not recently been activity);

A: Transmitter UE, UE_A, transmits PSCCH and PSSCH using slot 2 of the resource pool;

A: Another transmitter UE, UE_B, determines that it wishes to transmit to the receiver UE, UE_C;

B: Receiver UE, UE_C, responds to UE_A's transmission in resource pool instance A with a PSFCH that indicates that in the next instance of the resource pool it will monitor only the second slot of the resource pool (i.e. it sends an indication of "PS_state=slot 2" in the PSFCH);

B: UE_B monitors the resource pool for PSFCH and decodes the PSFCH from the receiver UE, UE_C, and hence determines that the receiver UE, UE_C, will monitor only slot 2 of the next instance of the resource pool;

C: Receiver UE, UE_C, monitors only the second slot of the resource pool;

C: Based on the PSFCH that it received in resource pool instance B, transmitter UE, UE_B, sends its PSCCH/PSSCH using slot 2 of the resource pool: this is the only slot that the receiver UE will monitor;

D: Receiver UE monitors the whole resource pool since it did not receive a PSCCH in the preceding instance of the resource pool. Based on reception of the PSCCH/PSSCH from UE_B in the preceding instance of the resource pool, UE_C sends a PSFCH indicating "PS state=slot 2", i.e. that it will only monitor slot 2 in the next resource pool instance;

E: Receiver UE, UE_C, only monitors slot 2 of the resource pool instance; and F: Since the receiver UE, UE_C, did not receive PSCCH in the preceding instance of the resource pool (i.e. instance E), it monitors the whole of resource pool instance F.

In arrangements of embodiments of the present technique described above, the receiver UE, UE_C, may monitor certain physical resources (e.g. restricted resources in one or more resource pool instances) based on previous PSCCH/PSSCH activity. However, in other arrangements of embodiments of the present technique the receiver UE can make autonomous decisions on which resources it will monitor in future instances of the resource pool and then signals those decisions via PSFCH. In other words, the receiving communications device may be configured to determine that it is to monitor for the one or more current signals in the subset during at least the first resource pool instance based on a predetermined condition being met, and to transmit an indication to the first transmitting communications device that the receiving communications device is going to monitor for the one or more current signals in the subset during at least the first resource pool instance. Here, the predetermined condition may comprise a number of signals received by the receiving communications device during a specified number of resource pool instances preceding the first resource pool instance being below a predetermined threshold. Alternatively, or in addition, the predetermined condition may comprise an amount of power consumed by the receiving communications device during a specified number of resource pool instances preceding the first resource pool instance being above a predetermined threshold. Such a specified number of resource pool instances and/or a predetermined threshold may be predetermined and known to the receiving communications device or may be set in the specifications, or may be signaled to the receiving communications device by the network (if the receiving communications device is within range of the network—if not one of the other communications devices may act as a relay node) via downlink control information (DCI) signaling, or via RRC signaling, or may be signaled to the receiving communications device by one of the other communications devices.

For example, the receiver UE could determine that it will only monitor slot 1 of the resource pool for the next 4 instances of the resource pool, e.g. if there has been little activity in the resource pool. In this case, the receiver UE would autonomously send a PSFCH indicating "PS state=slot 1; 4 instances". Any potential transmitter UE would monitor these PSFCH messages and store the contents in readiness for any potential future transmission.

Figure 20:
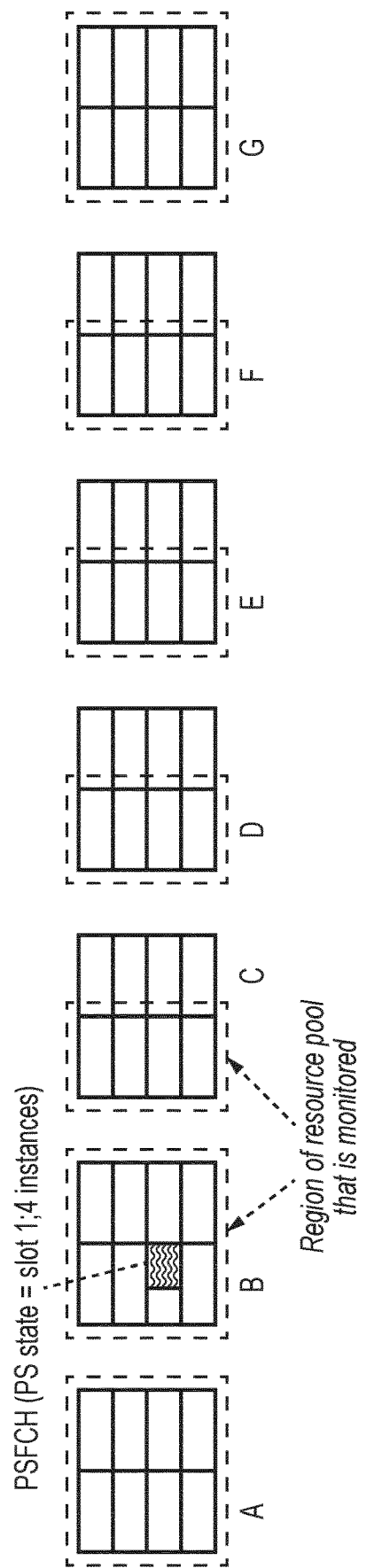
FIG. 20 illustrates an example of how a receiver UE may autonomously determine and indicate the resources it will monitor in future resource pool instances in accordance with embodiments of the present technique.

Those skilled in the art would appreciate here that, while it may appear wasteful for a UE that wishes to conserve power to make a transmission, the overall power consumption budget might, depending on implementation, be improved if the UE makes a short PSFCH transmission if that means that the UE can enter a low power state for a longer period of time. FIG. 20 illustrates the following functionality in accordance with such arrangements of embodiments of the present technique:

- A: Receiver UE, UE_C, monitors the whole resource pool, but is not scheduled. It determines that it should enter a lower power state by only monitoring a single slot for the next 4 resource pool instances;
- B: UE_C monitors the whole resource pool and sends PSFCH indicating "PS state=slot 1; 4 instances" to indicate that it will only monitor the first slot of the resource pool for the next 4 resource pool instances;
- C,D,E,F: UE_C only monitors slot 1 of the resource pool; and
- G: The 4 "power saving instances" of the resource pool are complete and UE_C monitors the whole resource pool.

In some arrangements of embodiments of the present technique, for cases where restricted resources are used during some instances of the resource pool and where feedback signals are received by the transmitter UE, UE_A, from the receiver UE, UE_C, if UE_A does not receive a feedback signal from UE_C, it continues to use the same resources that it previously used for communication with UE_C. In other words, the receiving communications device is configured to transmit, in response to receiving each of the one or more current signals, a feedback signal to the transmitting communications device indicating that the each of the one or more current signals has been successfully received. If such a feedback signal is not transmitted (for example because a current signal was not successfully received) or if the feedback signal is in some way corrupted, the first transmitting communications device is configured to determine that a feedback signal has not been received from the receiving communications device for one of the current signals transmitted by the first transmitting communications device, and subsequently to transmit a next signal to the receiving communications device in the subset during a next resource pool instance after the first resource pool instance.

Such arrangements provide some resilience against errors in the feedback signal channel. For example, if UE_C had received a communication (SIGNAL_1) from UE_A, it would send a feedback signal to UE_A and would monitor a restricted set of resources in the next instance of the resource pool. However if UE_A did not receive that feedback signal, UE_A would not know which of the following alternative cases applied:

- UE_C had not received SIGNAL_1 and hence was monitoring all resources for the next instance of the resource pool; or
- UE_C had received SIGNAL_1, but the feedback signal was errored in transmission back to UE_A. In this latter case, UE_C would be monitoring the restricted set of resources that had been used for the transmission of SIGNAL_1.

The safest course of action here therefore is for UE_C to continue to the use the restricted resources for the next communication with UE_A. In either of the two bulleted cases above, UE_C will be listening to at least that restricted set of resources; either as part of resources of the entire resource pool (the first case) or alone (the second case).

In some arrangements of embodiments of the present technique, when a transmitter UE, UE_A, has finished using a restricted set of resources to a receiver UE, UE_C, it sends a "STOP" signal. In other words, the first transmitting communications device is configured to determine that the first transmitting communications device has no signals to transmit to the receiving communications device in the subset during a third of the resource pool instances, wherein the third resource pool instance is a subsequent resource pool instance to the at least the first resource pool instance, and to transmit an indication to the receiving communications device that the first transmitting communications device has no signals to transmit to the receiving communications device in the subset during the third resource pool instance. Such a STOP signal has the following effects:

- Allows other transmitter UEs, UE_B, to use those restricted resources in future instances of the resource pool;
- Allows the receiver UE, UE_C, to change its behaviour:
  - Monitor the whole set of resources in future instances of the resource pool. In other words, the receiving communications device is configured, based on receiving the indication that the first transmitting communications device has no signals to transmit to the receiving communications device in the subset during the third resource pool instance, to monitor a larger number of the time-divided slots of the resource pool than in the subset and/or a larger number of the frequency-divided regions of the resource pool than in the subset for one or more next signals transmitted by one of the other communications devices during at least the third resource pool instance. Here, when monitoring this larger number of time-divided slots/frequency-divided regions, the receiving communications device may be configured to monitor the entire resource pool (i.e. all of the time-divided slots and all of the frequency-divided regions), or the receiving communications device may be configured to monitor a larger subset of the resource pool, where this larger subset comprises the subset; or
  - Sleep until a known future instance of the resource pool. In other words, the receiving communications device is configured, based on receiving the indication that the first transmitting communications device has no signals to transmit to the receiving communications device in the subset during the third resource pool instance, to enter a reduced power state in which the receiving communications device does not monitor for signals received by any of the other communications devices for a specified number of resource pool instances.

The STOP signal can be indicated as a known bit string, bit field or state within the PSCCH. In response to reception of the STOP signal, the receiver UE, UE_C, can send a feedback signal acknowledging reception of the STOP signal to the transmitter UE, UE_A.

Power Saving Status Comprises Number of Antennas used for Monitoring

As described above, in at least some arrangements of embodiments of the present technique, the power saving status may comprise a number of the plurality of antennas that are being used to monitor for signals transmitted by the first transmitting communications device while the receiving communications device is operating in accordance with an active monitoring state.

It should be appreciated by those skilled in the art that providing power to a limited number of antennas would of course result in a lower power consumption by the receiving communications device. When power consumption is not so much of an issue at the receiving UE (e.g. because it is a vehicular UE connected to a large battery) the UE may activate most or all of its antennas in order to increase reception diversity and increase the likelihood that signals transmitted to it by other UEs are received successfully.

Flow Diagram Representation

Figure 21:
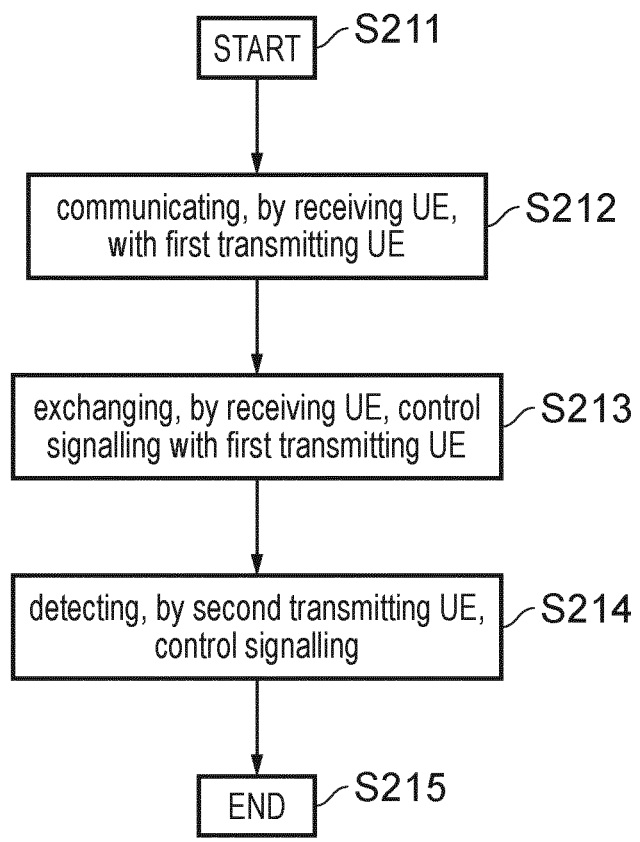
FIG. 21 is a flow diagram representation of a method of communications between a plurality of communications devices in accordance with embodiments of the present technique.

FIG. 21 shows a flow diagram illustrating a method of communications between a plurality of communications devices in accordance with at least some embodiments of the present technique.

The method begins in step S211. The method comprises, in step S212, receiving (or monitoring for) signals and/or transmitting signals, by a receiving communications device of the plurality of communications devices, from and/or to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions. In step S213, the method exchanging control signaling between the receiving communications device and the first transmitting communications device. Here, the control signaling comprises an indication of a current power saving status of the receiving communications device. In step S214, the process comprises detecting, by a second transmitting communications device of the plurality of communications devices that the first transmitting communications is exchanging control signaling with the receiving communications device, the second transmitting communications device having signals to transmit to the receiving communications device, wherein there is no active communications session between the second transmitting communications device and the receiving communications device. The process ends in step S215.

Those skilled in the art would appreciate that the method shown by FIG. 21 may be adapted in accordance with embodiments of the present technique. For example, other intermediate steps may be included in the method, or the steps may be performed in any logical order. Though embodiments of the present technique have been described largely by way of the example communications system shown in FIG. 11, and in accordance with the arrangements shown in FIGS. 12 to 20, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A receiving communications device comprising a transceiver configured to receive signals from and/or to transmit signals to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions, and a controller configured in combination with the transceiver to exchange control signaling with a first transmitting communications device of the plurality of other communications devices, wherein the control signaling comprises an indication of a current power saving status of the receiving communications device.

Paragraph 2. A receiving communications device according to Paragraph 1, wherein the power saving status is detectable by at least a second transmitting communications device of the plurality of other communications devices, the second transmitting communications device having signals to transmit to the receiving communications device, wherein there is no active communications session between the second transmitting communications device and the receiving communications device.

Paragraph 3. A receiving communications device according to Paragraph 1 or Paragraph 2, wherein the control signaling is received by the receiving communications device from the first transmitting communications device.

Paragraph 4. A receiving communications device according to Paragraph 3, wherein the control signaling is received via one of a Physical Sidelink Control Channel, PSCCH, and a Physical Sidelink Shared Channel, PSSCH.

Paragraph 5. A receiving communications device according to Paragraph 3 or Paragraph 4, wherein the power saving status had been previously indicated, as part of the control signaling, to the first transmitting communications device by the receiving communications device.

Paragraph 6. A receiving communications device according to any of Paragraphs 1 to 5, wherein the control signaling is transmitted by the receiving communications device to the first transmitting communications device.

Paragraph 7. A receiving communications device according to Paragraph 6, wherein the control signaling is transmitted via a Physical Sidelink Feedback Channel, PSFCH.

Paragraph 8. A receiving communications device according to any of Paragraphs 1 to 7, wherein the power saving status comprises a discontinuous reception, DRX, operation of the receiving communications device.

Paragraph 9. A receiving communications device according to Paragraph 8, wherein the receiving communications device is configured to receive the control signaling from the first transmitting communications device, wherein the control signaling comprises an indication of the DRX operation, the indication indicating to the receiving communications device to operate in accordance with the DRX operation.

Paragraph 10. A receiving communications device according to Paragraph 8 or Paragraph 9, wherein the DRX operation comprises one or more of:

a primary DRX operation in which the receiving communications device is configured, in accordance with a first periodic rate, to switch between an active monitoring state in which the receiving communications device monitors for signals received by the one or more of the other communications devices and a reduced power state in which the receiving communications device does not monitor for signals received by the one or more of the other communications devices, a secondary DRX operation in which the receiving communications device is configured, in accordance with a second periodic rate which is higher than the first periodic rate, to switch between the active monitoring state and the reduced power state, and an inactivity timer operation in which the receiving communications device is configured, for the duration of an inactivity period defined by an inactivity timer started upon reception of a signal by the receiving communications device, to stay in the active operating state.

Paragraph 11. A receiving communications device according to any of Paragraphs 1 to 10, wherein the power saving status comprises a restricted resource pool monitoring operation of the receiving communications device, wherein, when operating in accordance with the restricted resource pool monitoring operation, the receiving communications device is configured to monitor for one or more current signals transmitted by the first transmitting communications device to the receiving communications device in a subset of the time-divided slots and the frequency-divided regions of the resource pool during at least a first of the resource pool instances.

Paragraph 12. A receiving communications device according to Paragraph 11, wherein the subset is dependent on in which of the time-divided slots and the frequency-divided regions of the resource pool one or more previous signals were received by the receiving communications device from the first transmitting communications device during a second of the resource pool instances, wherein the second resource pool instance is a preceding resource pool instance to the first resource pool instance.

Paragraph 13. A receiving communications device according to Paragraph 12, wherein the time-divided slots and the frequency-divided regions of the subset are the same as the time-divided slots and the frequency-divided regions of the resource pool in which the one or more previous signals were received during the second resource pool instance.

Paragraph 14. A receiving communications device according to Paragraph 12 or Paragraph 13, wherein if the receiving communications device does not receive any of the one or more current signals in the subset during the first resource pool instance, the receiving communications device is configured to monitor a larger number of the time-divided slots of the resource pool than in the subset and/or a larger number of the frequency-divided regions of the resource pool than in the subset for one or more next signals during at least a third of the resource pool instances, wherein the third resource pool instance is a subsequent resource pool instance to the at least the first resource pool instance.

Paragraph 15. A receiving communications device according to any of Paragraphs 12 to 14, wherein the subset comprises all of the plurality of time-divided slots of the resource pool and only the frequency-divided regions of the resource pool in which the one or more previous signals were received during the second resource pool instance.

Paragraph 16. A receiving communications device according to any of Paragraphs 12 to 15, wherein the subset comprises all of the plurality of frequency-divided regions of the resource pool and only the time-divided slots of the resource pool in which the one or more previous signals were received during the second resource pool instance.

Paragraph 17. A receiving communications device according to any of Paragraphs 11 to 16, wherein the receiving communications device is configured to determine that it is to monitor for the one or more current signals in the subset during at least the first resource pool instance based on a predetermined condition being met, and to transmit an indication to the first transmitting communications device that the receiving communications device is going to monitor for the one or more current signals in the subset during at least the first resource pool instance.

Paragraph 18. A receiving communications device according to Paragraph 17, wherein the predetermined condition comprises a number of signals received by the receiving communications device during a specified number of resource pool instances preceding the first resource pool instance being below a predetermined threshold.

Paragraph 19. A receiving communications device according to Paragraph 17 or Paragraph 18, wherein the predetermined condition comprises an amount of power consumed by the receiving communications device during a specified number of resource pool instances preceding the first resource pool instance being above a predetermined threshold.

Paragraph 20. A receiving communications device according to any of Paragraphs 11 to 19, wherein the receiving communications device is configured to transmit, in response to receiving each of the one or more current signals, a feedback signal to the transmitting communications device indicating that the each of the one or more current signals has been successfully received.

Paragraph 21. A receiving communications device according to any of Paragraphs 11 to 20, wherein the receiving communications device is configured to receive an indication from the first transmitting communications device that the first transmitting communications device has no signals to transmit to the receiving communications device in the subset during a third of the resource pool instances, wherein the third resource pool instance is a subsequent resource pool instance to the at least the first resource pool instance.

Paragraph 22. A receiving communications device according to Paragraph 21, wherein the receiving communications device is configured, based on receiving the indication that the first transmitting communications device has no signals to transmit to the receiving communications device in the subset during the third resource pool instance, to monitor a larger number of the time-divided slots of the resource pool than in the subset and/or a larger number of the frequency-divided regions of the resource pool than in the subset for one or more next signals transmitted by one of the other communications devices during at least the third resource pool instance.

Paragraph 23. A receiving communications device according to Paragraph 21 or Paragraph 22, wherein the receiving communications device is configured, based on receiving the indication that the first transmitting communications device has no signals to transmit to the receiving communications device in the subset during the third resource pool instance, to enter a reduced power state in which the receiving communications device does not monitor for signals received by any of the other communications devices for a specified number of resource pool instances.

Paragraph 24. A receiving communications device according to any of Paragraphs 1 to 23, wherein the receiving communications device comprises a plurality of antennas which are configured, in combination with the transceiver, to receive the signals from and/or to transmit the signals to the one or more other communications devices,
  wherein the power saving status comprises a number of the plurality of antennas that are being used to monitor for signals transmitted by the first transmitting communications device while the receiving communications device is operating in accordance with an active monitoring state.

Paragraph 25. A method of operating a receiving communications device, the method comprising
  receiving signals from and/or transmitting signals to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions, and
  exchanging control signaling with a first transmitting communications device of the plurality of other communications devices,
  wherein the control signaling comprises an indication of a current power saving status of the receiving communications device.

Paragraph 26. Circuitry for a receiving communications device comprising
  transceiver circuitry configured to receive signals from and/or to transmit signals to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions, and
  controller circuitry configured in combination with the transceiver circuitry
  to exchange control signaling with a first transmitting communications device of the plurality of other communications devices,
  wherein the control signaling comprises an indication of a current power saving status of the receiving communications device.

Paragraph 27. A first transmitting communications device comprising
  a transceiver configured to receive signals from and/or to transmit signals to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions, and
  a controller configured in combination with the transceiver
  to exchange control signaling with a receiving communications device of the plurality of other communications devices,
  wherein the control signaling comprises an indication of a current power saving status of the receiving communications device.

Paragraph 28. A first transmitting communications device according to Paragraph 27, wherein the power saving status is detectable by at least a second transmitting communications device of the plurality of other communications devices, the second transmitting communications device having signals to transmit to the receiving communications device, wherein there is no active communications session between the second transmitting communications device and the receiving communications device.

Paragraph 29. A first transmitting communications device according to Paragraph 27 or Paragraph 28, wherein the control signaling is transmitted by the first transmitting communications device to the receiving communications device.

Paragraph 30. A first transmitting communications device according to Paragraph 29, wherein the control signaling is transmitted via one of a Physical Sidelink Control Channel, PSCCH, and a Physical Sidelink Shared Channel, PSSCH.

Paragraph 31. A first transmitting communications device according to Paragraph 29 or Paragraph 30, wherein the power saving status had been previously indicated, as part of the control signaling, to the first transmitting communications device by the receiving communications device.

Paragraph 32. A first transmitting communications device according to any of Paragraphs 27 to 31, wherein the control signaling is received by the first transmitting communications device from the receiving communications device.

Paragraph 33. A first transmitting communications device according to Paragraph 32, wherein the control signaling is transmitted via a Physical Sidelink Feedback Channel, PSFCH.

Paragraph 34. A first transmitting communications device according to any of Paragraphs 27 to 33, wherein the power saving status comprises a discontinuous reception, DRX, operation of the receiving communications device.

Paragraph 35. A first transmitting communications device according to Paragraph 34, wherein the first transmitting communications device is configured to transmit the control signaling to the receiving communications device, wherein the control signaling comprises an indication of the DRX operation, the indication indicating to the receiving communications device to operate in accordance with the DRX operation.

Paragraph 36. A first transmitting communications device according to Paragraph 34 or Paragraph 35, wherein the DRX operation comprises one or more of:
  a primary DRX operation in which the receiving communications device is configured, in accordance with a first periodic rate, to switch between an active monitoring state in which the receiving communications device monitors for signals received by the one or more of the other communications devices and a reduced power state in which the receiving communications device does not monitor for signals received by the one or more of the other communications devices,
  a secondary DRX operation in which the receiving communications device is configured, in accordance with a second periodic rate which is higher than the first periodic rate, to switch between the active monitoring state and the reduced power state, and
  an inactivity timer operation in which the receiving communications device is configured, for the duration of an inactivity period defined by an inactivity timer started upon reception of a signal by the receiving communications device, to stay in the active operating state.

Paragraph 37. A first transmitting communications device according to any of Paragraphs 27 to 36, wherein the power saving status comprises a restricted resource pool monitoring operation of the receiving communications device, wherein the first transmitting communications device is configured to determine that the receiving communications device, when operating in accordance with the restricted resource pool monitoring operation, is monitoring for one or more current signals transmitted by the first transmitting communications device to the receiving communications device in a subset of the time-divided slots and the frequency-divided regions of the resource pool during at least a first of the resource pool instances.

Paragraph 38. A first transmitting communications device according to Paragraph 37, wherein the subset is dependent on in which of the time-divided slots and the frequency-divided regions of the resource pool one or more previous signals were received by the receiving communications device from the first transmitting communications device during a second of the resource pool instances, wherein the second resource pool instance is a preceding resource pool instance to the first resource pool instance.

Paragraph 39. A first transmitting communications device according to Paragraph 38, wherein the time-divided slots and the frequency-divided regions of the subset are the same as the time-divided slots and the frequency-divided regions of the resource pool in which the one or more previous signals were received during the second resource pool instance.

Paragraph 40. A first transmitting communications device according to Paragraph 38 or Paragraph 39, wherein the first transmitting communications device is configured
 to determine that, if the receiving communications device does not receive any of the one or more current signals in the subset during the first resource pool instance, the receiving communications device is monitoring a larger number of the time-divided slots of the resource pool than in the subset and/or a larger number of the frequency-divided regions of the resource pool than in the subset for one or more next signals during at least a third of the resource pool instances, wherein the third resource pool instance is a subsequent resource pool instance to the at least the first resource pool instance.

Paragraph 41. A first transmitting communications device according to any of Paragraphs 38 to 40, wherein the subset comprises all of the plurality of time-divided slots of the resource pool and only the frequency-divided regions of the resource pool in which the one or more previous signals were received during the second resource pool instance.

Paragraph 42. A first transmitting communications device according to any of Paragraphs 38 to 41, wherein the subset comprises all of the plurality of frequency-divided regions of the resource pool and only the time-divided slots of the resource pool in which the one or more previous signals were received during the second resource pool instance.

Paragraph 43. A first transmitting communications device according to any of Paragraphs 37 to 42, wherein the first transmitting communications device is configured
 to receive an indication from the receiving communications device that the receiving communications device is going to monitor for the one or more current signals in the subset during at least the first resource pool instance.

Paragraph 44. A first transmitting communications device according to any of Paragraphs 37 to 43, wherein the first transmitting communications device is configured
 to receive, in response to transmitting each of the one or more current signals, a feedback signal from the receiving communications device indicating that the each of the one or more current signals has been successfully received.

Paragraph 45. A first transmitting communications device according to any of Paragraphs 37 to 44, wherein the first transmitting communications device is configured
 to determine that a feedback signal has not been received from the receiving communications device for one of the current signals transmitted by the first transmitting communications device, and subsequently
 to transmit a next signal to the receiving communications device in the subset during a next resource pool instance after the first resource pool instance.

Paragraph 46. A first transmitting communications device according to any of Paragraphs 37 to 45, wherein the first transmitting communications device is configured
 to determine that the first transmitting communications device has no signals to transmit to the receiving communications device in the subset during a third of the resource pool instances, wherein the third resource pool instance is a subsequent resource pool instance to the at least the first resource pool instance, and
 to transmit an indication to the receiving communications device that the first transmitting communications device has no signals to transmit to the receiving communications device in the subset during the third resource pool instance.

Paragraph 47. A first transmitting communications device according to Paragraph 46, wherein the first transmitting communications device is configured
 to determine that the receiving communications device, based on transmitting the indication that the first transmitting communications device has no signals to transmit to the receiving communications device in the subset during the third resource pool instance, is going to monitor a larger number of the time-divided slots of the resource pool than in the subset and/or a larger number of the frequency-divided regions of the resource pool than in the subset for one or more next signals transmitted by one of the other communications devices during at least the third resource pool instance.

Paragraph 48. A first transmitting communications device according to Paragraph 46 or Paragraph 47, wherein the first transmitting communications device is configured
 to determine that the receiving communications device, based on transmitting the indication that the first transmitting communications device has no signals to transmit to the receiving communications device in the subset during the third resource pool instance, is going to enter a reduced power state in which the receiving communications device does not monitor for signals received by any of the other communications devices for a specified number of resource pool instances.

Paragraph 49. A first transmitting communications device according to any of Paragraphs 27 to 48, wherein the receiving communications device comprises a plurality of antennas which are configured, in combination with the transceiver, to receive the signals from and/or to transmit the signals to the one or more other communications devices,
 wherein the power saving status comprises a number of the plurality of antennas that are being used to monitor for signals transmitted by the first transmitting communications device while the receiving communications device is operating in accordance with an active monitoring state.

Paragraph 50. A method of operating a first transmitting communications device, the method comprising
 receiving signals from and/or transmitting signals to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions, and exchanging control signaling with a receiving communications device of the plurality of other communications devices, wherein the control signaling comprises an indication of a current power saving status of the receiving communications device.

Paragraph 51. Circuitry for a first transmitting communications device comprising transceiver circuitry configured to receive signals from and/or to transmit signals to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions, and controller circuitry configured in combination with the transceiver circuitry to exchange control signaling with a receiving communications device of the plurality of other communications devices, wherein the control signaling comprises an indication of a current power saving status of the receiving communications device.

Paragraph 52. A second transmitting communications device comprising a transceiver configured to receive signals from and/or to transmit signals to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions, and a controller configured in combination with the transceiver to determine that the second transmitting communications device has signals to transmit to a receiving communications device of the plurality of other communications devices, wherein there is no active communications session between the second transmitting communications device and the receiving communications device, and to detect that a first transmitting communications device of the plurality of other communications devices is exchanging control signaling with the receiving communications device, wherein there is an active communications session between the first transmitting communications device and the receiving communications device, wherein the control signaling comprises an indication of a current power saving status of the receiving communications device.

Paragraph 53. A second transmitting communications device according to Paragraph 52, wherein the second transmitting communications device is configured to transmit the signals to the receiving communications device in accordance with the current power saving status of the receiving communications device.

Paragraph 54. A second transmitting communications device according to Paragraph 52 or Paragraph 53, wherein the control signaling is transmitted by the first transmitting communications device to the receiving communications device.

Paragraph 55. A second transmitting communications device according to Paragraph 54, wherein the control signaling is transmitted via one of a Physical Sidelink Control Channel, PSCCH, and a Physical Sidelink Shared Channel, PSSCH.

Paragraph 56. A second transmitting communications device according to Paragraph 54 or Paragraph 55, wherein the power saving status had been previously indicated, as part of the control signaling, to the first transmitting communications device by the receiving communications device.

Paragraph 57. A second transmitting communications device according to any of Paragraphs 52 to 56, wherein the control signaling is transmitted by the receiving communications device to the first transmitting communications device.

Paragraph 58. A second transmitting communications device according to Paragraph 57, wherein the control signaling is transmitted via a Physical Sidelink Feedback Channel, PSFCH.

Paragraph 59. A second transmitting communications device according to any of Paragraphs 52 to 58, wherein the power saving status comprises a discontinuous reception, DRX, operation of the receiving communications device.

Paragraph 60. A second transmitting communications device according to Paragraph 59, wherein the DRX operation comprises one or more of:

a primary DRX operation in which the receiving communications device is configured, in accordance with a first periodic rate, to switch between an active monitoring state in which the receiving communications device monitors for signals received by the one or more of the other communications devices and a reduced power state in which the receiving communications device does not monitor for signals received by the one or more of the other communications devices, a secondary DRX operation in which the receiving communications device is configured, in accordance with a second periodic rate which is higher than the first periodic rate, to switch between the active monitoring state and the reduced power state, and an inactivity timer operation in which the receiving communications device is configured, for the duration of an inactivity period defined by an inactivity timer started upon reception of a signal by the receiving communications device, to stay in the active operating state.

Paragraph 61. A second transmitting communications device according to any of Paragraphs 52 to 60, wherein the power saving status comprises a restricted resource pool monitoring operation of the receiving communications device, wherein the second transmitting communications device is configured to determine that the receiving communications device, when operating in accordance with the restricted resource pool monitoring operation, is monitoring for one or more first current signals transmitted by the first transmitting communications device to the receiving communications device in a first subset of the time-divided slots and the frequency-divided regions of the resource pool during at least a first of the resource pool instances.

Paragraph 62. A second transmitting communications device according to Paragraph 61, wherein the first subset is dependent on in which of the time-divided slots and the frequency-divided regions of the resource pool one or more first previous signals were received by the receiving communications device from the first transmitting communications device during a second of the resource pool instances, wherein the second resource pool instance is a preceding resource pool instance to the first resource pool instance.

Paragraph 63. A second transmitting communications device according to Paragraph 62, wherein the time-divided slots and the frequency-divided regions of the first subset are the same as the time-divided slots and the frequency-divided regions of the resource pool in which the one or more first previous signals were received during the second resource pool instance.

Paragraph 64. A second transmitting communications device according to Paragraph 62 or Paragraph 63, wherein the second transmitting communications device is configured
to determine that, if the receiving communications device does not receive any of the one or more first current signals in the first subset during the first resource pool instance, the receiving communications device is monitoring a larger number of the time-divided slots of the resource pool than in the first subset and/or a larger number of the frequency-divided regions of the resource pool than in the first subset for one or more next signals during at least a third of the resource pool instances, wherein the third resource pool instance is a subsequent resource pool instance to the at least the first resource pool instance.

Paragraph 65. A second transmitting communications device according to any of Paragraphs 62 to 64, wherein the first subset comprises all of the plurality of time-divided slots of the resource pool and only the frequency-divided regions of the resource pool in which the one or more first previous signals were received during the second resource pool instance.

Paragraph 66. A second transmitting communications device according to any of Paragraphs 62 to 65, wherein the first subset comprises all of the plurality of frequency-divided regions of the resource pool and only the time-divided slots of the resource pool in which the one or more first previous signals were received during the second resource pool instance.

Paragraph 67. A second transmitting communications device according to any of Paragraphs 61 to 66, wherein the second transmitting communications device is configured
to determine that the receiving communications device, when operating in accordance with the restricted resource pool monitoring operation, is monitoring for one or more second current signals transmitted by a third transmitting communications device of the plurality of communications devices to the receiving communications device in a second subset of the time-divided slots and the frequency-divided regions of the resource pool during at least the second resource pool instance,
to perform a logical OR function on the first subset and the second subset, and
to determine, based on a result of the logical OR function, a third subset of the time-divided slots and the frequency-divided regions of the resource pool within which the second transmitting communications device is to transmit the signals to the receiving communications device during at least the first resource pool instance.

Paragraph 68. A second transmitting communications device according to any of Paragraphs 52 to 67, wherein the receiving communications device comprises a plurality of antennas which are configured, in combination with the transceiver, to receive the signals from and/or to transmit the signals to the one or more other communications devices,
wherein the power saving status comprises a number of the plurality of antennas that are being used to monitor for signals transmitted by the first transmitting communications device while the receiving communications device is operating in accordance with an active monitoring state.

Paragraph 69. A method of operating a second transmitting communications device, the method comprising
receiving signals from and/or transmitting signals to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions,
determining that the second transmitting communications device has signals to transmit to a receiving communications device of the plurality of other communications devices, wherein there is no active communications session between the second transmitting communications device and the receiving communications device, and
detecting that a first transmitting communications device of the plurality of other communications devices is exchanging control signaling with the receiving communications device, wherein there is an active communications session between the first transmitting communications device and the receiving communications device,
wherein the control signaling comprises an indication of a current power saving status of the receiving communications device.

Paragraph 70. Circuitry for a second transmitting communications device comprising
transceiver circuitry configured to receive signals from and/or to transmit signals to one or more of a plurality of other communications devices within sidelink communications resources of a plurality of resource pool instances of a sidelink interface, each of the resource pool instances being arranged in time in accordance with a resource pool periodicity, the resource pool being formed of a plurality of time-divided slots and a plurality of frequency-divided regions, and
controller circuitry configured in combination with the transceiver circuitry
to determine that the second transmitting communications device has signals to transmit to a receiving communications device of the plurality of other communications devices, wherein there is no active communications session between the second transmitting communications device and the receiving communications device, and
to detect that a first transmitting communications device of the plurality of other communications devices is exchanging control signaling with the receiving communications device, wherein there is an active communications session between the first transmitting communications device and the receiving communications device,
wherein the control signaling comprises an indication of a current power saving status of the receiving communications device.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-172834, "Revised WID on New Radio Access Technology," NTT DOCOMO, RAN #78.
[3] TR 38.840, "NR: Study on UE Power Saving (Release 16, v0.1.0)", 3GPP, November 2018.
[4] TS 36.300, "Evolved Universal Terrestrial Radio Access (E-UTRA) and Evolved Universal Terrestrial Radio Access Network (E-UTRAN); Overall description; Stage 2 (Release 16, v16.0.0)", 3GPP, January 2020.
[5] TS 38.321, "NR: Medium Access Control (MAC) Protocol Specification (Release 15, v15.4.0)", 3GPP, January 2019.

What is claimed is:

1. A receiving communications device comprising:
a transceiver configured to receive signals from and/or to transmit signals to one or more of a plurality of other communications devices within sidelink communications resources of a plurality of resource pool instances of a sidelink interface, each of the resource pool instances being arranged in time in accordance with a resource pool periodicity, each of the resource pool instances being formed of a plurality of time-divided slots and a plurality of frequency-divided regions, and
a controller configured in combination with the transceiver
to exchange control signalling with a first transmitting communications device of the plurality of other communications devices,
wherein the control signalling comprises an indication of a current power saving status of the receiving communications device,
the power saving status comprises a restricted resource pool monitoring operation of the receiving communications device, wherein, when operating in accordance with the restricted resource pool monitoring operation, the receiving communications device is configured to monitor for one or more current signals transmitted by the first transmitting communications device to the receiving communications device in a subset of the time-divided slots and the frequency-divided regions of a resource pool instance during at least a first of the resource pool instances, and
the subset is dependent on in which of the time-divided slots and the frequency-divided regions of the resource pool instance one or more previous signals were received by the receiving communications device from the first transmitting communications device during a second of the resource pool instances, wherein the second resource pool instance is a preceding resource pool instance to the first resource pool instance.

2. The receiving communications device according to claim 1, wherein the control signalling includes the indication of power saving status such that it is detectable by at least a second transmitting communications device of the plurality of other communications devices without a communications session between the second transmitting communications device and the receiving communications device, the second transmitting communications device having signals to transmit to the receiving communications device.

3. The receiving communications device according to claim 1, wherein the control signalling is received by the receiving communications device from the first transmitting communications device.

4. The receiving communications device according to claim 3, wherein the control signalling is received via one of a Physical Sidelink Control Channel (PSCCH) and a Physical Sidelink Shared Channel (PSSCH).

5. The receiving communications device according to claim 3, wherein the power saving status had been previously indicated, as part of the control signalling, to the first transmitting communications device by the receiving communications device.

6. The receiving communications device according to claim 1, wherein the control signalling is transmitted by the receiving communications device to the first transmitting communications device.

7. The receiving communications device according to claim 6, wherein the control signalling is transmitted via a Physical Sidelink Feedback Channel (PSFCH).

8. The receiving communications device according to claim 1, wherein the power saving status comprises a discontinuous reception (DRX) operation of the receiving communications device.

9. The receiving communications device according to claim 8, wherein the receiving communications device is configured to receive the control signalling from the first transmitting communications device, wherein the control signalling comprises an indication of the DRX operation, the indication indicating to the receiving communications device to operate in accordance with the DRX operation.

10. The receiving communications device according to claim 8, wherein the DRX operation comprises one or more of:
- a primary DRX operation in which the receiving communications device is configured, in accordance with a first periodic rate, to switch between an active monitoring state in which the receiving communications device monitors for signals received by the one or more of the other communications devices and a reduced power state in which the receiving communications device does not monitor for signals received by the one or more of the other communications devices,
- a secondary DRX operation in which the receiving communications device is configured, in accordance with a second periodic rate which is higher than the first periodic rate, to switch between the active monitoring state and the reduced power state, and
- an inactivity timer operation in which the receiving communications device is configured, for the duration of an inactivity period defined by an inactivity timer started upon reception of a signal by the receiving communications device, to stay in the active operating state.

11. The receiving communications device according to claim 1, wherein the time-divided slots and the frequency-divided regions of the subset are the same as the time-divided slots and the frequency-divided regions of the resource pool instance in which the one or more previous signals were received during the second resource pool instance.

12. The receiving communications device according to claim 1, wherein if the receiving communications device does not receive any of the one or more current signals in the subset during the first resource pool instance, the receiving communications device is configured
- to monitor a larger number of the time-divided slots of the resource pool instance than in the subset and/or a larger number of the frequency-divided regions of the resource pool instance than in the subset for one or more next signals during at least a third of the resource pool instances, wherein the third resource pool instance is a subsequent resource pool instance to the at least the first resource pool instance.

13. The receiving communications device according to claim 1, wherein the subset comprises all of the plurality of time-divided slots of the resource pool instance and only the frequency-divided regions of the resource pool instance in which the one or more previous signals were received during the second resource pool instance.

14. The receiving communications device according to claim 1, wherein the subset comprises all of the plurality of frequency-divided regions of the resource pool instance and only the time-divided slots of the resource pool instance in which the one or more previous signals were received during the second resource pool instance.

15. The receiving communications device according to claim 1, wherein the receiving communications device is configured
- to determine that it is to monitor for the one or more current signals in the subset during at least the first resource pool instance based on a predetermined condition being met, and
- to transmit an indication to the first transmitting communications device that the receiving communications device is going to monitor for the one or more current signals in the subset during at least the first resource pool instance.

16. The receiving communications device according to claim 1, wherein the receiving communications device is configured
- to transmit, in response to receiving each of the one or more current signals, a feedback signal to the transmitting communications device indicating that the each of the one or more current signals has been successfully received.

17. A method of operating a receiving communications device, the method comprising:
- receiving signals from and/or transmitting signals to one or more of a plurality of other communications devices within sidelink communications resources of a plurality of resource pool instances of a sidelink interface, each of the resource pool instances being arranged in time in accordance with a resource pool periodicity, each of the resource pool instances being formed of a plurality of time-divided slots and a plurality of frequency-divided regions, and
- exchanging control signalling with a first transmitting communications device of the plurality of other communications devices,
- wherein the control signalling comprises an indication of a current power saving status of the receiving communications device,
- the power saving status comprises a restricted resource pool monitoring operation of the receiving communications device, wherein, when operating in accordance with the restricted resource pool monitoring operation, the receiving communications device is configured to monitor for one or more current signals transmitted by the first transmitting communications device to the receiving communications device in a subset of the time-divided slots and the frequency-divided regions of a resource pool instance during at least a first of the resource pool instances, and
- the subset is dependent on in which of the time-divided slots and the frequency-divided regions of the resource pool instance one or more previous signals were received by the receiving communications device from the first transmitting communications device during a second of the resource pool instances, wherein the second resource pool instance is a preceding resource pool instance to the first resource pool instance.

* * * * *